United States Patent
Rodinger et al.

(10) Patent No.: US 12,072,524 B2
(45) Date of Patent: *Aug. 27, 2024

(54) SYSTEMS AND METHODS FOR PROVIDING COUPLED LIGHTING PANELS

(71) Applicant: NANOLEAF ENERGY TECHNOLOGY SHENZHEN LIMITED, Guangdong (CN)

(72) Inventors: Tomas Rodinger, Vancouver (CA); Henry Chow, Toronto (CA); Jennelle Wong, Vancouver (CA); Nathan Dyck, Burlington (CA); Gimmy Chu, Toronto (CA)

(*) Notice: Subject to any disclaimer, the term of this patent is extended or adjusted under 35 U.S.C. 154(b) by 0 days.

This patent is subject to a terminal disclaimer.

(21) Appl. No.: 18/148,433

(22) Filed: Dec. 30, 2022

(65) Prior Publication Data
US 2023/0161097 A1 May 25, 2023

Related U.S. Application Data

(63) Continuation of application No. 16/646,579, filed as application No. PCT/CN2018/099827 on Aug. 10, 2018, now Pat. No. 11,543,586.
(Continued)

(51) Int. Cl.
*F21V 8/00* (2006.01)
*F21V 17/10* (2006.01)
(Continued)

(52) U.S. Cl.
CPC ............ *G02B 6/008* (2013.01); *F21V 17/104* (2013.01); *F21V 21/005* (2013.01);
(Continued)

(58) Field of Classification Search
CPC ............. F21Y 2115/10; F21Y 2113/10; F21V 21/005; F21V 17/04; G02B 6/008; G02B 6/0015; G02B 6/0083
See application file for complete search history.

(56) References Cited

U.S. PATENT DOCUMENTS 11,543,586 B2 * 1/2023 Rodinger .................. F21S 2/00
2010/0232178 A1 9/2010 Wu et al.
(Continued)

FOREIGN PATENT DOCUMENTS

CN 101435891 A 5/2009
CN 102197257 A 9/2011
(Continued)

OTHER PUBLICATIONS

EPO, Search Report.

*Primary Examiner* — Anabel Ton
(74) *Attorney, Agent, or Firm* — OPES IP Consulting Co., Ltd.

(57) ABSTRACT

A series of interconnected (directly or indirectly), coupled lighting panels is provided, the coupled lighting panels linked to one another such that various shapes and designs can be created using various arrangements of the coupled lighting panels, the lighting panels of some embodiments adapted to avoid dark spots proximate to lighting circuitry disposed therein. The lighting panels can be luminaires, and may be provided in various geometric shapes, having various dimensionalities (e.g., a flat 2 dimensional shape, or a 3 dimensional shape). Various control systems, connectors, housings, frames, and lighting systems are also described.

16 Claims, 21 Drawing Sheets

Related U.S. Application Data

(60) Provisional application No. 62/557,549, filed on Sep. 12, 2017.

(51) Int. Cl.
  *F21V 21/005* (2006.01)
  *F21Y 113/10* (2016.01)
  *F21Y 115/10* (2016.01)

(52) U.S. Cl.
  CPC ......... *G02B 6/0015* (2013.01); *G02B 6/0046* (2013.01); *G02B 6/0083* (2013.01); *F21Y 2113/10* (2016.08); *F21Y 2115/10* (2016.08)

(56) References Cited

U.S. PATENT DOCUMENTS

| | | |
|---|---|---|
| 2011/0013415 A1 | 1/2011 | Meir et al. |
| 2011/0199559 A1 | 8/2011 | Nakamura |
| 2011/0299298 A1 | 12/2011 | Liang |
| 2017/0090103 A1 | 3/2017 | Holman |

FOREIGN PATENT DOCUMENTS

| | | |
|---|---|---|
| CN | 204422807 U | 6/2015 |
| WO | 2017106124 A2 | 6/2017 |

\* cited by examiner

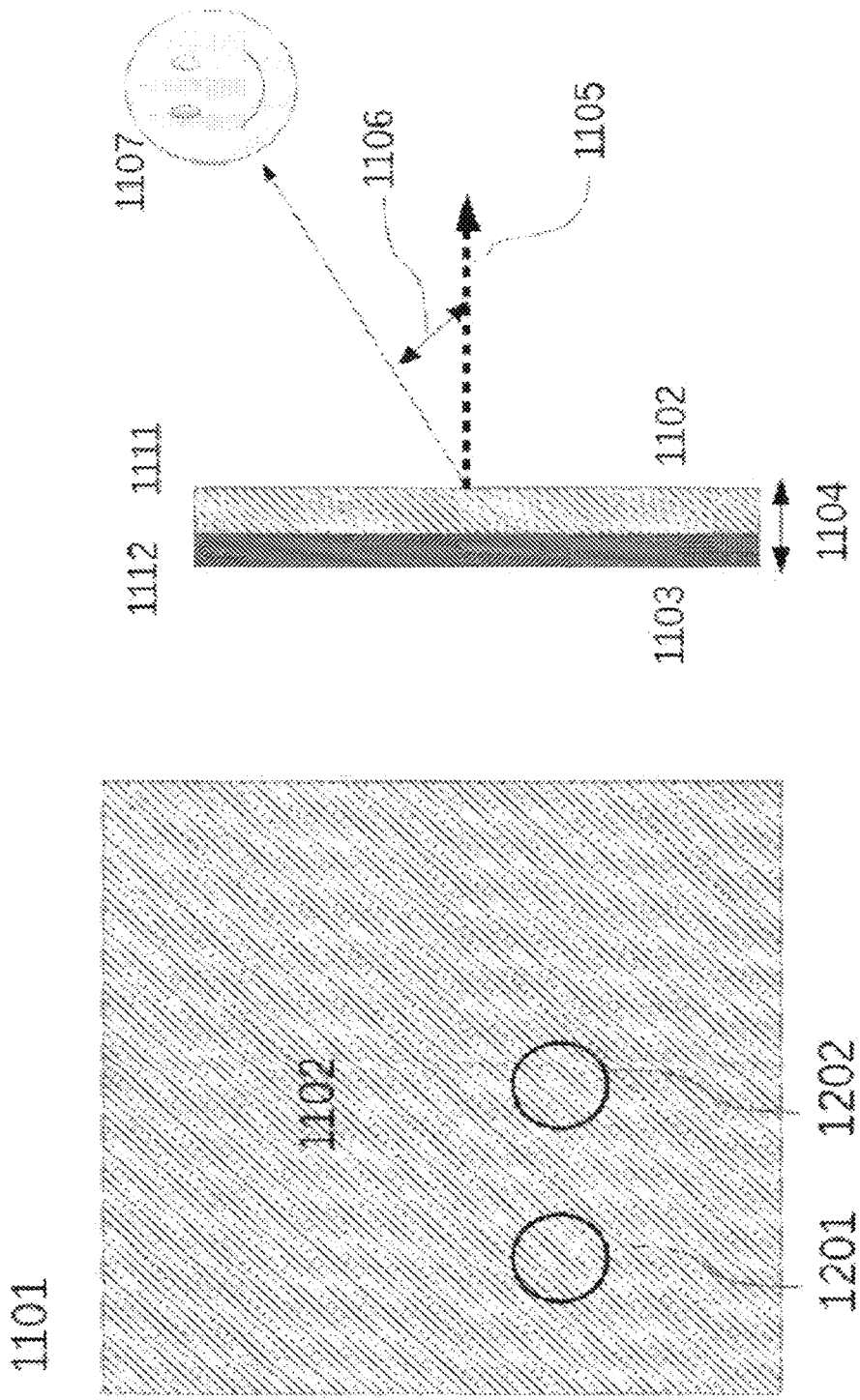

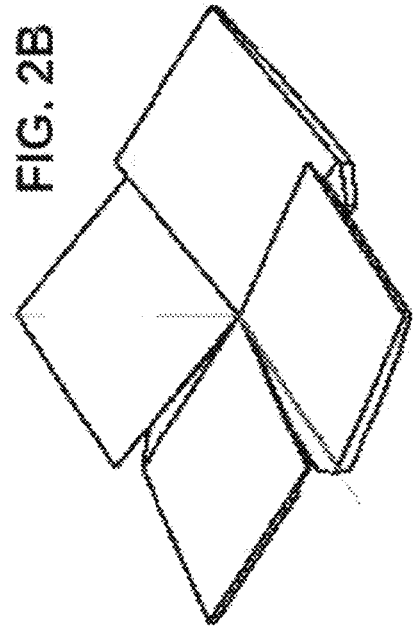
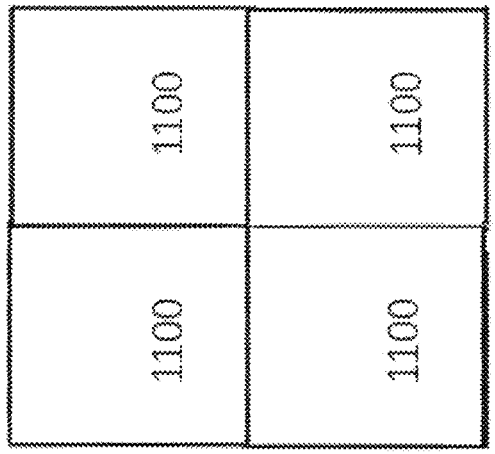

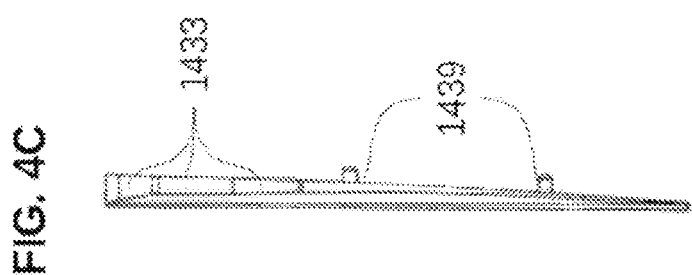
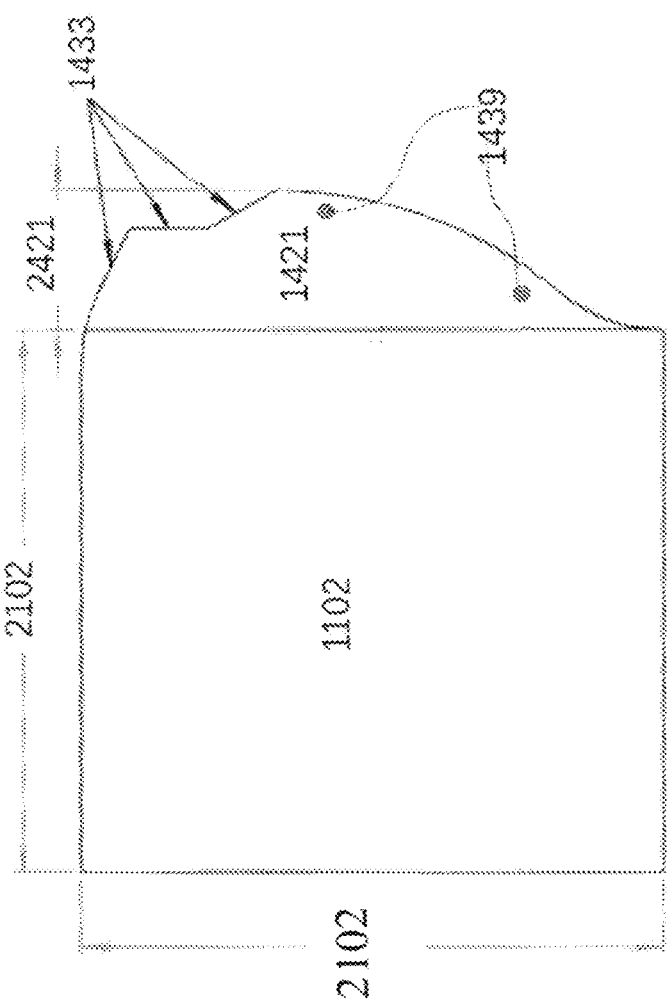
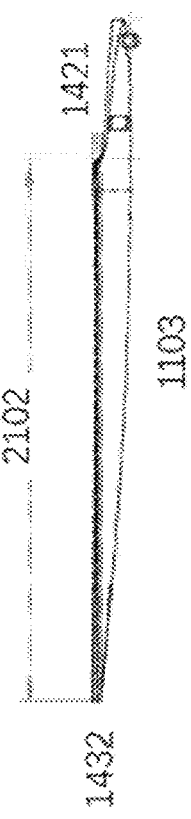

SYSTEMS AND METHODS FOR PROVIDING COUPLED LIGHTING PANELS

CROSS-REFERENCE TO RELATED APPLICATIONS

This application is a non-provisional of, and claims all benefit, including priority to, U.S. Application No. 62/557,549, filed 12 Sep. 2017, and dated 12 Sep. 2017, incorporated herein by reference.

FIELD OF THE INVENTION

Some embodiments generally relate to the field of lighting devices, and more specifically, to coupled lighting panels.

BACKGROUND OF THE INVENTION

Architecture and interior design elements provide various applications in which controlled lighting is desirable. Lighting may impact the mood and well-being of occupants, and may provide a pleasing aesthetic quality to an environment. However, providing coupled and/or controllable lighting panels may be technically challenging given that it may be desirable to have the lighting panels flexibly adapt to various types of internal environments.

SUMMARY OF THE INVENTION

A series of interconnected (directly or indirectly), coupled lighting panels is provided, the coupled lighting panels linked to one another such that various shapes and designs can be created using various arrangements of the coupled lighting panels. The lighting panels can be luminaires, and may be provided in various geometric shapes, having various dimensionalities (e.g., a flat 2 dimensional shape, or a 3 dimensional shape).

The interconnected, coupled lighting panels have innovative optical and structural characteristics that provide tangible improvements in relation to emission of light, reduced cost of manufacture, and ease of detachable interconnectability. The interconnected panels can be configured, for example, for electrical interconnection such that power is shared across the interconnected panels by way of their coupling (e.g., via linking sections or external linker joints).

The interconnected lighting panels can receive control signals (e.g., ZigBee signals, PWM signals) which control lighting elements disposed within that control lighting characteristics of the lighting panels (e.g., brightness/dimness, spectral power distribution, light frequency), among others. Co-ordinated patterns can then be controlled for display across the interconnected panels, for example, based on an identified or detected layout of the interconnected panels (e.g., a wave effect that travels longitudinally across a plurality of panels).

An overall lighting system is provided in some embodiments where power is received at either a separate power control device (e.g., a hub attachment) or at one of the lighting panels. Power and control signals are propagated across the lighting panels through mechanical couplings and/or linker portions such that power and control signals are able to reach every one of the lighting panels, the overall geometry and shape identified through the connections upon which power and/or control is propagated. The system can, in some embodiments, receive control signals indicating specific panels be lit up, have particular colors, brightness/dimness, and convert and/or propagate these signals to control the specific panels accordingly.

A kit, in some embodiments, includes a lighting system having a power/control hub receiving power from a power source and a plurality of lighting panels. The kit is interoperable with smart home devices (e.g., Amazon Alexa™, Google Home Assistant™, Apple HomeKit™), and once the lighting panels are set up in accordance with a geometric shape, the lighting panels can be controlled through commands provided through the smart home devices.

The improvements of some embodiments overcome challenges in other designs in relation to reducing "hot/dark spots" in relation to light observed by a viewer. These "hot/dark spots" occur as light is not evenly distributed or sources of emission from lighting elements is concealed or otherwise concentrated, which is undesirable in relation to interconnected, coupled light panels (where it is not the intended pattern or display shown) The improvements of some embodiments in particular overcome the use of a visible frame in other designs in order to conceal spots of concentrated light near the edges of the light panels. For some embodiments the challenge in other designs in relation to structural properties of the panel, such as upper bounds on weight and thickness, are overcome concurrently with the optical challenges. Thick and heavy panels are undesirable in relation to convenient and economical installation and shipping.

The reduction of hot/dark spots, within the tightly prescribed structural properties of the luminaire, occurs due to specific geometric (e.g., shape, pattern) and light emission configurations as described in some preferred embodiments described herein. Such hot/dark spots are especially undesirable for interconnected lighting panels where a coordinated pattern is meant to be spread across one or more interconnected lighting panels.

This optical light transmission problem, among others, is addressed through the descriptions of the embodiments provided herein, including improved structural geometric features for guiding emitted light for reflections therein, application of microstructures for light dispersion, and improved approaches to tessellate or otherwise tile or conceal and/or cover portions of overlapping or otherwise interconnected lighting panels. Microstructures include material coatings applied to portions of surfaces (external or internal) of the lighting panels that modify or cause the dispersion of light incident to the microstructures. For example, they can be embossed, or otherwise etched onto surfaces.

The lighting panels, in some embodiments, have adjoining portions and/or surfaces that serve to propagate and/or re-direct light such that a "cover and cloaking" (in a preferred embodiment), or a "tessellate and conceal" (in an alternate preferred embodiment) mechanism is provided.

Microstructures of one or more materials are utilized in some embodiments and deposed within (e.g., positioned and/or oriented) or coupled with the panels to influence light emission/re-direction properties of the coupled lighting panels. The density, orientation, and/or configuration of the microstructures is tunable to some extent to modify lighting characteristics of the emitted light incident to the viewer. The lighting panels have internal surfaces that are angled or otherwise modify and/or redirect light rays, causing, for example, scattering or redirection within the lighting panels. There are alternative angles and geometries that are possible, and the present application describes several alternate approaches that represent preferred embodiments. However, there may be other geometries possible. In an embodiment, the microstructures are adapted such that a deviation of amount of emitted light from any surface element of the plurality of second surfaces from an average amount of emitted light from all surface elements of the plurality of second surfaces is less than 20% (or 5%, 10%, 15%, according to various other embodiments).

The re-direction of light and modification of emission characteristics provides for improved distribution, mixing of light such that optical hot spots, dark spots, and/or other type of band structure or visual artifact can be avoided. Accordingly, a substantial majority or proportion of the surface incident to a viewer can be utilized to provide mixed and evenly distributed light in a lighting panel that can be relatively flat and re-configurable (as opposed to alternative lights which may require bezels, trim, non-light emitting portions, covered areas, or larger sizes, among others, to hide the sections from which light is being produced or darker structural sections.

Accordingly, the lighting panels are more flexibly utilized for different types of ornamental and/or functional arrangements where lighting panels may have been constrained in the past (e.g., kitchen backsplash, walls of lighting panels, lighting panel art, and other creative applications thereof). A potential reason why these applications typically did not include controllable lighting panels includes issues relating to cost, heat, undesirable dark areas, panel thickness.

For more creative applications of the lighting panels, the physically constrained environments dictate requirements for thin-ness and flat-ness of the lighting panels, especially, for example, in areas where space in a venue or a premise is very expensive and there is a need to keep the panels as thin as possible while maintaining adequate lighting characteristics.

Methods of manufacturing are described herein as well, directed to improvements in economies of scale and ease of manufacturing.

In an aspect, there is provided a luminaire comprising: at least one light-emitting diode (LED); a plurality of light-transmitting bodies; wherein each light-transmitting body of the plurality of light-transmitting bodies comprises: a first surface through which the light from the at least one LED enters the light-transmitting body; a second surface through which the light exits the light-transmitting body; a core coupled to both the first surface and the second surface, such that light propagates through the core between the first surface and the second surface; wherein, the first surface is situated below a plane of the second surface; wherein, a first light-transmitting body in the plurality of light-transmitting bodies is arranged in relation to at least one second light-transmitting body in the plurality of light-transmitting bodies, such that, the LED, the first surfaces and segments of the core of the plurality of light-transmitting bodies are concealed as the luminaire is electrically powered and is viewed from an acute angle relative the normal vector of any of the second surfaces of the light-transmitting bodies of the plurality of light-transmitting bodies.

In another aspect, each light-transmitting body further comprises microstructures configured to redirect light incident thereto, a spatial arrangement of the microstructures inside the light-transmitting bodies, and the shape of the core of the light-transmitting bodies is adapted such that any surface element of the second surfaces emits a proportion of the light that entered the light-transmitting body through at least one of its first surfaces.

In another aspect, the spatial arrangement of the microstructures inside the light-transmitting bodies, and the shape of the core of the light-transmitting bodies is adapted such that a deviation of amount of emitted light from any surface element of the plurality of second surfaces from an average amount of emitted light from all surface elements of the plurality of second surfaces is less than 20%.

In another aspect, any first light-transmitting body in the plurality of light-transmitting bodies is arranged relative one second and one third light-transmitting body in the plurality of light-transmitting bodies, such that the first surface and the segment of the core of the first light-transmitting body are contained in a cavity underneath the second surface of the second light-transmitting body in the plurality of light-transmitting bodies, and the second surface of the first light-transmitting body covers from above a cavity in which the first surface and the segment of the core of the third light-transmitting body in the plurality of light-transmitting bodies is contained.

In another aspect, a recursive relation on indices of the plurality of light-transmitting bodies is applied, such that any second surface of a light-transmitting body covers from above one and only one first surface and a segment of the core of another light-transmitting body, and that any first surface and the segment of the core of a light-transmitting body is disposed in a cavity underneath one and only one second surface of another light-transmitting body.

In another aspect, the light-transmitting body is thinner at a greater separation from the first surface than at a shorter separation from the first surface, given that both the shorter and greater separations are above a threshold, such that the relative amount of the light that propagates through the light-transmitting body that is redirected by reflection to exit the second surface increases as the distance from the shorter to the greater separation increases.

In another aspect, the surface elements of the second surface closest to the first surface of the light-transmitting body are positioned in relation to the core and the first surface, such that surface elements of the second surface closest to the first surface of the light-transmitting body are reachable by light that enters through the first surface and that propagates through the light-transmitting body in a path without scattering of a scattering angle greater than about 45 degrees.

In another aspect, the core of the light-transmitting body is made of polymethylmethacrylate.

In another aspect, the core of the light-transmitting body is a contiguous body of transparent or semi-transparent material molded such that the first surface is below the second surface.

In another aspect, the core of the light-transmitting body is comprised of two parts coupled at an interface, wherein only one part is molded in a non-planar shape such that the first surface is below the second surface.

In another aspect, the second surfaces of the light-transmitting body have a surface area more than one-hundred times as large as the surface area of the first surfaces of the light-transmitting body.

In another aspect, the microstructures of the light-transmitting bodies are comprised of particles of Titanium Oxide that redirect light by random scattering.

In another aspect, the microstructures of the light-transmitting bodies are comprised of sub-millimeter indentations into the second surface of the light-emitting bodies.

In another aspect, the plurality of microstructures of the light-emitting bodies is contained within a sub-millimeter layer adjacent the second surfaces of the light-emitting bodies.

In another aspect, comprising an internal electrical driver that is concealed as the luminaire is electrically powered and is viewed from an acute angle relative the normal vector of any of the second surfaces.

In another aspect, the LED emits light comprised of red, green, blue and white light of tunable magnitudes as defined by tunable electrical current that electrically powers the LED.

In another aspect, the plurality of light-transmitting bodies comprises four light-transmitting bodies, wherein the second surfaces are shaped as squares, and the luminaire appears as a square as the luminaire is viewed from an acute angle relative the normal vector of any of the second surfaces.

In another aspect, there is provided a method for generating light from a plurality of light-transmitting bodies, the method comprising: powering, by an electric driver, at least one light-emitting diode (LED), the at least one LED coupled to a plurality of light-transmitting bodies; and arranging the light-transmitting bodies relative each other, such that a cavity underneath one light-transmitting body houses segments of a second light-transmitting body; and emitting light from the at least one LED, the light distributed such that the electric driver, the LED, and parts of the light-transmitting bodies are concealed from an observer as the electric driver powers the LED, and the observer views the emitted light from an acute angle relative any normal vector of the illuminated surfaces of the light-transmitting bodies.

In another aspect, the method further includes propagating the light that entered the light-transmitting body from the electrically powered LED to the illuminated surfaces, such that any surface element of the illuminated surfaces emits a proportion of the light.

In another aspect, the method further includes propagating the light that entered the light-transmitting body from the electrically powered LED to the illuminated surfaces, such that the deviation of amount of emitted light from any surface element of the illuminated surfaces from the average amount of emitted light from all surface elements of the illuminated surfaces is less than 20%.

In another aspect, the method further includes spatial arranging of any first light-transmitting body in the plurality of light-transmitting bodies relative one second and one third light-transmitting body in the plurality of light-transmitting bodies, such that the LED coupled to the first light-transmitting body is fully contained in a cavity underneath the illuminated surface of the second light-transmitting body in the plurality of light-transmitting bodies, and the illuminated surface of the first light-transmitting body covers from above a cavity in which the LED coupled to the third light-transmitting body in the plurality of light-transmitting bodies is contained.

In another aspect, the method further includes positioning the light transmitting bodies in accordance with a recursive relation on the indices of the plurality of light-transmitting bodies, such that any illuminated surface of a light-transmitting body covers from above at least one LED coupled to one other light-transmitting body of the plurality of light-transmitting bodies, and that any LED coupled to a light-transmitting body of the plurality of light-transmitting bodies is in a cavity underneath one and only one illuminated surface of another light-transmitting body.

In another aspect, there is provided a luminaire comprising: at least one light-emitting diode (LED); one light-transmitting body; the light-transmitting body including: a first surface through which light from the at least one LED enters the light-transmitting body; a second surface through which light exits the light-transmitting body; a core coupled to both a first surface and a second surface, such that light can propagate between a first surface and a second surface; at least one opaque layer which blocks light incident thereto; microstructures configured to redirect light incident in relation to at least one of the at least one first surface, the second surface, and the core; wherein the first surface is situated below the plane of the second surface; wherein the opaque layer is positioned relative the first surface and the LED, such that no light from the LED enters the light-transmitting body by any surface other than the first surface; wherein at least one segment of the core of the light-transmitting body covers from above at least one cavity in which the LED, the first surface and the opaque layer is contained, and wherein at least one segment of the second surface is disposed above said segment of the core such that, the LED, the opaque layer, the plurality of first surfaces are concealed as the luminaire is electrically powered and is viewed from an acute angle relative the normal vector of the second surface.

In another aspect, the spatial arrangement of the microstructures inside the light-transmitting bodies, and the shape of the core of the light-transmitting bodies are configured, such that any surface element of the second surfaces emits a proportion of the light that entered the light-transmitting body through at least one of its first surfaces.

In another aspect, the spatial arrangement of the microstructures inside the light-transmitting bodies, and the shape of the core of the light-transmitting bodies is adapted such that a deviation of amount of emitted light from any surface element of the plurality of second surfaces from an average amount of emitted light from all surface elements of the plurality of second surfaces is less than 20%.

In another aspect, the luminaire includes a cavity which contains the LED, a first surface and an opaque layer, wherein the shape of the core of the light-transmitting body and the placement of microstructures are adapted, such that a portion of all light from the LED enters the light-transmitting body through the first surface is redirected by reflection and scattering, propagates through the segment of the core of the light-transmitting body that covers from above the cavity in which the LED, the first surface and the opaque layer is contained, and by reflection and scattering exits the light-transmitting body through the segment of the second surface above the segment of the core of the light-transmitting body.

In another aspect, the luminaire includes at least two cavities each of which contains an LED, a first surface and an opaque layer, wherein the shape of the core of the light-transmitting body and the placement of microstructures and the relative placement of the cavities are configured, such that a portion of all light from the first LED enters the light-transmitting body through the first of the first surfaces, propagates through the core of the light-transmitting body to the segment of the core of the light-transmitting body that covers from above the cavity in which the second LED, the second of the first surfaces and the second of the opaque layers are contained, and by reflection and scattering exits the light-transmitting body through the segment of the second surface above said segment of the core of the light-transmitting body.

In another aspect, the core of the light-transmitting body is made of polymethylmethacrylate.

In another aspect, the core of the light-transmitting body is a contiguous body of transparent or semi-transparent material molded such that the first surface is below the second surface.

In another aspect, the core of the light-transmitting body is comprised of two parts coupled via an interface, wherein only one part is molded in a non-planar shape such that the first surface is below the second surface.

In another aspect, the second surfaces of the light-transmitting body have a surface area more than one-hundred times as large as the surface area of the first surfaces of the light-transmitting body.

In another aspect, the microstructures of the light-transmitting bodies are comprised of particles of Titanium Oxide that redirect light by random scattering.

In another aspect, the microstructures of the light-transmitting bodies are comprised of sub-millimeter indentations into the second surface of the light-emitting bodies.

In another aspect, the plurality of microstructures of the light-emitting bodies is contained within a sub-millimeter layer adjacent the second surfaces of the light-emitting bodies.

In another aspect, the luminaire further includes an internal electrical driver that is concealed as the luminaire is electrically powered and is viewed from an acute angle relative the normal vector of any of the second surfaces.

In another aspect, the LED emits light comprised of red, green, blue and white light of tunable magnitudes as defined by tunable electrical current that electrically powers the LED.

In another aspect, four distinct cavities are situated at the four corners of the light-transmitting body with a second surface in the shape of a square, wherein each cavity contains at least one LED, a first surface, and an opaque material surface, wherein the shape of the core of the light-transmitting body and the placement of microstructures are configured, such that a portion of the light that enters the light-transmitting body through the first of the first surfaces exits through the segments of the second surface above the second, third and fourth cavity.

In another aspect, three distinct cavities are situated at the three apexes of the light-transmitting body with a second surface in the shape of an equilateral triangle, wherein each cavity contains at least one LED, a first surface, and an opaque material surface, wherein the shape of the core of the light-transmitting body and the placement of microstructures are configured, such that a portion of the light that enters the light-transmitting body through the first of the first surfaces exits through the segments of the second surface above the second and third cavity.

In another aspect, there is provided method for emitting light, the method comprising: powering, using an electric driver, at least one light-emitting diode (LED), and coupling the at least one LED to one light-transmitting body that includes: a first surface through which light from the at least one LED enters the light-transmitting body; a second surface through which light exits the light-transmitting body; a core coupled to both the first surface and the second surface, such that light propagates through the core between the first surface and the second surface;

wherein, the first surface is situated below a plane of the second surface; and wherein at least one segment of the light-transmitting body covers from above at least one cavity in which the LED is contained, wherein the segment of the light-transmitting body is of a finite thickness, and the electric driver, the LED, and parts of the light-transmitting body are concealed from an observer as the electric driver powers the LED, and the observer views the emitted light from an acute angle relative any normal vector of the illuminated surface of the light-transmitting body.

In another aspect, the method includes propagating the light that entered the light-transmitting body from the LED to the illuminated surfaces such that any surface element of the illuminated surfaces emits a nonzero proportion of the light.

In another aspect, the method includes propagating the light that entered the light-transmitting body from the LED to the illuminated surfaces such that a deviation of amount of emitted light from any surface element of the illuminated surfaces from an average amount of emitted light from all surface elements of the illuminated surfaces is less than 20%.

In another aspect, there is provided a luminaire attachment frame system for operation in combination with a plurality of appreciably flat luminaires, each luminaire having an interior surface and an exterior surface, the luminaire attachment frame system comprising: a plurality of frames, each frame with a front face, a back face and four edges, a plurality of slots in the edges of the frames, each slot connecting the exterior of the frame and the interior of a frame along an axis in the plane of the front and back of the frame; at least one latch disposed in the frame detachably coupling the front face of the frame to the interior surface of the luminaire; a plurality of conductive bodies; wherein the pair of slots is provided in parallel alignment of a pair of adjacent frames accommodates one conductive body that bridges between the frames, and a conductive body couples electrically to a luminaire detachably coupled to the front face of the frame such that a luminaire coupled to a frame conceals the frame, the slots, the latches, the conductive bodies as the luminaire is electrically powered and is viewed from an acute angle relative the normal vector of the exterior surface, and the plurality of luminaires is electrically powered given one luminaire in the plurality of luminaires is electrically powered.

In another aspect, the frame system includes comprising a plurality of holes between front face and back face of the frame, through which at least one screw or nail inserted attaches the frame to a rigid surface in contact with the back face of the frame.

In another aspect, an electrical signal transferred between a pair of adjacent luminaires by conduction of the conductive body, is modulated, such that a data array is transferred from one luminaire to the other luminaire.

In another aspect, the frame system further includes a plurality of slots in the edges of the frames, wherein a slot connects the exterior of the frame and the interior of a frame along an axis in the plane of the front and back of the frame, wherein the slots are shaped to accommodate a cable, such that a luminaire coupled to a frame conceals the cable that bridges across adjacent luminaires through the slots, and as the luminaire is electrically powered and is viewed from an acute angle relative the normal vector of the exterior surface.

In various further aspects, the disclosure provides corresponding systems and devices, and logic structures such as machine-executable coded instruction sets for implementing such systems, devices, and methods.

In this respect, before explaining at least one embodiment in detail, it is to be understood that the embodiments are not limited in application to the details of construction and to the arrangements of the components set forth in the following description or illustrated in the drawings. Also, it is to be understood that the phraseology and terminology employed herein are for the purpose of description and should not be regarded as limiting.

Many further features and combinations thereof concerning embodiments described herein will appear to those skilled in the art following a reading of the instant disclosure.

BRIEF DESCRIPTION OF DRAWINGS

In the figures, embodiments are illustrated by way of example. It is to be expressly understood that the description and figures are only for the purpose of illustration and as an aid to understanding.

Embodiments will now be described, by way of example only, with reference to the attached figures, wherein in the figures:

FIGS. 1A, 1B illustrate a front view and a side view, respectively, of a flat panel luminaire in a square shape viewed at an angle by a human observer in an architectural, interior design or other application.

FIGS. 2A, 2B, 2C illustrate a front view, perspective view, and a side view, respectively, of one embodiment wherein the larger square panel is divided into four smaller light-transmitting bodies that are partially overlapping, such that electronics and LED light sources, along with a segment of the core, are concealed from a human observer without using a frame or other opaque concealment.

FIGS. 4A, 4B, 4C illustrate a particular embodiment of a panel of optical material, such that in combination with three electrically powered LED packages placed at one particular edge per panel, four such units when placed adjacent to each other, following a 90-degree clockwise rotation, constitute a larger square visible to the human observer, where areas of concentrated light are concealed, and the larger square has a luminous emittance much less concentrated and thus agreeable to the eye.

DETAILED DESCRIPTION OF THE INVENTION

Figure 3A:
FIGS. 3A, 3B, 3C, 3D show side views of an intersection of some embodiments with LEDs and a segment of a core at a lowered position relative the exterior surface of the panel, wherein the segment of the core and the interior surface can be shaped in a variety of ways, according to some embodiments.

Applicant is an innovator in lighting and has invested considerable research and development resources into developing modular and configurable lighting solutions that are, in some configurations, capable of integration with smart-home control solutions. Applicants' LED lighting technologies, for example, have provided improved clean energy/technology solutions that reduce an overall carbon footprint and energy consumption, relative to some other lighting technologies.

Manufacturing lighting panels, especially those incorporating "green technologies" is technically challenging as there are different aspects to be taken into consideration. Manufacturing may only be practical at sufficient scale, for example, and limitations on manufacturing resources and/or power consumption may require improved approaches and structural configurations as described herein. LED lighting, in particular, if more widely adopted, can reduce overall power consumption relative to conventional lighting.

However, there are challenges with LED lighting and producing LED lights, as the components themselves can be cumbersome, bulky, and can otherwise include inconsistent and/or deficient lighting that may not be aesthetically appealing.

As described herein, embodiments relate to an appreciably flat luminaire, the method of its construction, and a system to join several luminaires for illumination of a room, office or a space in general. An assembly, in some embodiments, is provided that includes a combination of luminaires connected to one another and/or a frame.

Flat panels (e.g., less than 1 cm in width) are especially challenging to manufacture. Without the additional space that a conventional lighting unit would have (e.g., a ballast portion, a housing area for circuitry), flat panels that are illuminated using LEDs are susceptible to uneven lighting, and an inability to produce light across the entire front surface of the flat panel as the required lighting components may themselves block out light.

The luminaire of the described embodiments overcomes these deficiencies through an improved structure. There are a number of preferred variants described below, and Applicant notes that the features of the variants are not limited to the described variants, but combinations and permutations of the features of the variants are also contemplated.

In FIG. 1A the luminaire 1101 is illustrated as an illuminated square of some dimensions. The luminaire has an exterior surface 1102, from which light rays or quanta are emitted into the room, office or space in general. The optical properties of the emitted light, in some embodiments, are tuneable, such as total flux of light, and hue and saturation of the optical spectrum.

There can be spatial variations with respect to the optical properties of the emitted light rays or quanta as they exit at the plurality of surface element 1201 of the exterior surface 1102. The variations can be such that a certain surface element 1201 emits a greater intensity of light than a neighboring surface element 1202.

This property of the luminous emittance can be quantified as a degree of light uniformity.

The appreciably flat luminaire 1101 can, in addition to an exterior surface 1102, be comprised of an interior surface or interior part in general 1103, which can be joined to the exterior surface 1102, as illustrated in FIG. 1B, which shows the appreciably flat luminaire 1101 at a ninety degree angle compared to FIG. 1A. As described in various embodiments, the external surface 1102 is a second surface through which the light exits the light-transmitting body, and the and the interior surface 1103 is a surface in which the light from the at least one LED enters the light-transmitting body.

The interior part includes components and materials 1112 that serve electrical, optical and mechanical functions of the luminaire. These materials can be opaque or aesthetically unfit to an interior design. Accordingly, these materials may be undesirable and require concealment or masking from the viewpoint of a target individual. As described herein, in a preferred embodiment, the interior part, including components and materials 1112 are hidden through an innovative approach to light distribution and emission that effectively conceals the components and materials 1112 through a combination of structural features.

The material of the panel 1111, which the exterior surface is part of, can be a transparent or semi-transparent material, which can include microscopic components that diffuse or scatter light rays or quanta. The luminaire has a specific thickness 1104, which is a sum of at least the thickness of the interior part and the panel, which can be considered a core of a luminaire, according to some embodiments, coupled to both the first surface and the second surface, such that light propagates through the core between the first surface and the second surface.

In its intended applications in architecture and interior design, the appreciably flat luminaire 1101 illuminates a room, office or space in general, and is viewed by a human observer 1107. The human observer 1107 can view the luminaire from a range of angles 1106 relative the normal vector 1105 of the exterior surface 1102.

This includes applications wherein the luminaire is mounted in the ceiling, on a wall, or as tiles in the floor. The surface area of the exterior surface 1102 can be 225 square centimeters. In some applications the thickness 1104 is small, such that the luminaire is easy to use, install, and is comprised of a modest amount of material, or in short, that the luminaire is practically perceived as a flat object. The thickness 1104 can be 10 millimeters, or less than 7% of the length of a side of the exterior surface 1102.

In some applications the degree of light uniformity is such that there are no surface elements 1201 where little to no light is emitted and thus would appear dark. In these applications therefore no opaque frame or other opaque material is part of the exterior surface 1102, such as its sides, and the interior parts 1103 are positioned such that they do not interact with the light rays or quanta to create dark areas the human observer 1107 can see within some range of angles 1106. The degree of uniformity can be quantified as the relative deviation of light intensity of any surface element 1201 from the average light intensity of all surface elements, and it can be, but is not limited to, 20% or less.

A plurality of luminaires of these properties can comprise a system of adjacent panels with an appearance of a certain geometric form, such that the plurality appears to a human observer 1107 within some range of viewing angles 1106 to be one contiguous luminaire. In some applications each individual panel 1101 is controllable with respect to its optical output.

Each luminaire is a light-transmitting body in a plurality of light-transmitting bodies and is structurally configured as described in various embodiments below such that each luminaire is arranged in relation to another light-transmitting body in the plurality of light-transmitting bodies, such that, the LED, the first surfaces and segments of the core of the plurality of light-transmitting bodies are concealed as the luminaire is electrically powered, from a viewing angle (e.g., an acute angle relative the normal vector of any of the second surfaces of the light-transmitting bodies of the plurality of light-transmitting bodies).

As described herein, an innovative approach to avoiding dark spots on relatively flat and thin panels includes luminaires that have structural adaptions that allow for spatial arrangements using tessellation and concealment approaches, or covering and cloaking approaches. These approaches, including structural features and spatial arrangements in accordance with the structural features, allow for practical implementations of flat, interlocking lighting panels that, at least from the perspective of a viewer, avoid dark spots that would otherwise be visible (e.g., due to the physical light-generation components and circuitry).

Improved interlocking structural features between panels, in addition to waveguide/internal reflection structural features are described in various embodiments. Further, a variety of optical effects can be executed for the plurality of luminaires that take into account the geometric form of the system of adjacent panels, in order to more broadly meet architectural and interior design requirements than luminaires or lighting products of other designs.

The design requirements described above are not obviously attained due to fundamental properties of optics and practical limitations of materials. Products on the market are therefore required to trade-off at least one objective against another, as will be described further below. The present innovation is a luminaire of novel design, and a system that combines a plurality of luminaires, such that the architectural and interior design specifications as described above and illustrated in FIG. 1 can be obtained with fewer trade-offs and less manual effort by an architect, interior designer or user in general. The luminaire, the method, the range of optical and mechanical configurations, and the technical reasons for these outcomes, are described in detail in the sections to folio.

Lighting Design Objectives and Constraints.

The source of the light of LED lamps and luminaires is one or a plurality of solid-state semiconductors, that is the light-emitting diodes. The dimensions of the diodes can be a few millimeters or less. Consequently they are very small in comparison with the dimensions of lamps and luminaires that are typically used in architecture and interior design. The light-emitting diodes can be packaged, that is be placed upon a substrate that can dissipate heat, coated in a protective substance, where the substance can contain a phosphor that through Stokes shifting alters the optical spectrum. One package can contain one or a plurality of light-emitting diodes. The plurality can be comprised of identical types, or of different types, of diodes. Packaged light-emitting diodes can be custom built or purchased off-the-shelf, including, but not limited to EVERLIGHT™ EAHP2835WM1, OSRAM™ DURIS E 2835, ROHM Semiconductor™ MSL0402RGBU1. In the description to follow, the term LED or LED source refers generally to an LED package however its construction or specification.

LEDs are powered by a direct current (DC) of electricity. The current can be of a certain magnitude, such as but not limited to 300 milliampere, 500 milliampere and 1000 milliampere. The electrical voltage can be of a certain magnitude, such as but not limited to 1.5 Volts, 2.0 Volts, 2.5 Volts, 4.0 Volts. An electrical current translates to a magnitude of light output, or luminous flux, from the LEDs, where these relations are published in spec sheets for different LEDs, or measured with electrical and optical equipment.

The electrical current can be supplied via an electrical driver, which is comprised of an electronic circuit and components that in different ways modulates and transforms an input current into an output current for the LEDs, while secondary properties of the electrical driver, such as size, lifetime, thermal properties, electromagnetic interference, total harmonic distortion, power factor, are within specified limits, where such specification can be regulated by governments. The electrical driver can be designed with skills in electrical engineering, such as documented in Fundamentals of Power Electronics by Robert W Erickson and Dragan Maksimovic, 2001, Springer.

The control of the electrical current can furthermore be encoded in data arrays that are received via an antenna tuned to receive electromagnetic radiation of a specific frequency, such as but not limited to 900 kilohertz, 2.4 gigahertz, and 5 gigahertz. The antenna can be integrated with the electronic circuit or be a separate component coupled to the electronic circuit.

The electrical driver can be comprised of components that absorb light, and the electrical driver can be considered to have undesirable aesthetic properties. Therefore, the electrical driver can be positioned within the luminaire such that it is concealed and interferes little if at all with the light from the LEDs. In some luminaires, the electrical driver is internal, such that the luminaire can be directly connected to a general-purpose electrical power supply, such as the electrical grid. In some luminaires, the electrical driver is external, such that the luminaire can be directly connected to an external circuit that supplies the electrical current as required by the LEDs of the luminaire. As LEDs are described below as being electrically powered, the electrical current can be from either an internal or an external electrical driver, unless otherwise stated.

The small dimensions of LEDs imply that LEDs are highly concentrated sources of light, or in other words, each individual LED in operation has a high luminous emittance. Therefore, many LED lamps and luminaires used in architecture and interior design include a secondary optics to optically transform, by some means of light-matter interaction, the light rays or quanta from the LEDs such that the light becomes pleasant to view. Highly concentrated dots of light in an architectural or interior design application create glare, in lighting design terminology. Glare is undesired in many applications, such as lighting for reading, orientation in a space or to create a pleasant ambiance in a restaurant or dining room at dusk or nighttime.

With an appropriate optical transformation, the small dimensions of the LEDs can however be beneficial to lighting and luminaire design, since they enable many more form-factors and thus enables additional architectural and interior design applications. Neither incandescent nor fluorescent lighting technology are readily amenable to a flat form-factor, for example.

Flat or thin form-factors can have benefits beyond aesthetic preferences, exploration and market differentiation. Over the course of a day for a given space, the activities may vary, the type of people that occupy it, and where they are in their circadian rhythm. These features of the use of the room, office or space in general can impact what comprises an optimal lighting for the human occupants. That includes lighting properties such as degree of contrast to the darker background, intensity and uniformity of the illuminated surfaces, and placement relative eye-level of the occupants. Many spatial as well as optical properties of the lighting can impact the comfort, efficiency, mood and well-being of the occupants of the space, see The Lighting Handbook 10th Edition published by the Illuminating Engineering Society.

One consequence of luminaires with novel form-factors can be that the conventional method to mechanically secure the lamp or luminaire by a lamp socket, such as a screw or pin socket, are not possible. Other means to couple luminaires to the electrical grid or secure luminaires in a room, office or space in general can be needed.

A thin luminaire of low weight can with less constraints be integrated with surfaces other than the ceiling when compared to heavier luminaires, or to lamps and luminaires that are thicker. Walls, floors, cupboards, pillars or support columns, as well as certain furniture and hardware can in addition to the ceiling be the area to which thin luminaires are mounted. Therefore, with appropriate mechanical design a thin luminaire enables additional means to design beneficial lighting in architecture and interior design.

A thin luminaire with the above properties can also be installed such that a plurality of luminaires are joined adjacent to at least one other luminaire of the plurality. In these cases the entire assembly can be operated as a single unit for illumination. This includes applications where light appears to spatially move throughout the assembled unit, either as a function of time and circadian rhythm of the human occupants of the architectural space, or as a function of ambient music sensed through a microphone, or as a function of events represented as changing digital data arrays or integers. Other applications of temporal and spatial adjustments of optical output from the assembled unit can be contemplated.

Some embodiments described below relate to the creation of lighting that is more suitable than lighting presently on the market to one or more of the varying needs of the people occupying an artificially illuminated space, by overcoming the technical challenges, optical, mechanical, and electrical, to transform the light from the concentrated LED sources into the desired form as well as enable the lighting device to be mounted on any of the many available surfaces in a room, office or space in general.

Optical Mechanisms of Light Mixing.

A luminaire comprised of an appreciably flat panel in a polygonal or other geometric shape 1101 can be created by injecting a plurality of light rays or quanta from small and concentrated LED sources into the light-transmitting body made of a transparent or semi-transparent material of the panel 1111, after which the light rays or quanta propagate through the light-transmitting body according to some plurality of pathways, to finally exit mostly through the larger exterior surface 1102 of the appreciably flat panel. For lighting design, a desirable feature of the light exiting the panel of the luminaire can be that it is less concentrated than the source LEDs, and that the light appears in large part or fully spread out over the surface of the panel, with complete uniformity as one limit of the plurality of optical transformations part of the plurality of pathways through the material of the panel. This feature implies that the light rays or quanta do not exit through optical hot spots of light, or bands of light of different intensities or other optical features, such as color variation.

A consequence of optical transformations is the mixing of the light rays or quanta. In one limit of optical transformations, the initially highly concentrated light rays or quanta from the LED sources are randomly scattered a very large number of times, such that all signs of the concentrated initial distribution of the light rays or quanta are lost. The mixing in practice is finite, but it can still be sufficient to bring light patterns or variations below the threshold the human eye can resolve.

A desirable feature of the light mixing that takes place at least in part within the panel material, is that a minimum of light rays or quanta are lost in one or several absorption events, scattering events or other optical transformations that reduce the amount of light rays or quanta that exit the panel through its larger exterior surface. Absorption of light rays or quanta can take place as the light interacts with molecular matter somewhere along a pathway, such that the internal energetic levels of the molecular matter is excited through the absorption of the energy of the light.

The degree of mixing of light can be a variable to consider in the design of a luminaire of certain light quality. The loss of light due to mixing can be a variable to consider in the optimization of the operational economy and energy efficiency of the electrically powered luminaire. These properties of the luminaire can be varied and optimized within the spatial constraints that the architecture or interior design imposes, or the prudent use of materials in order to create a product of sound economy. A plurality of variables of the luminaire construction that can affect one or both of the above features include, but it not limited to, type of material the light is injected into, the shape and dimensions of the light-transmitting body the light is injected into, the material or structural variation employed to mix the light rays or quanta, the optical material or structural variation used to stimulate the light rays or quanta to exit the material they were injected into, the relative placement of the source LEDs and the light-transmitting body the light is injected into, and any additional materials and their placement in order to further modulate the spatial or optical properties of the light rays or quanta that exits either towards the exterior or interior part of the luminaire.

One of the spatial requirements that can exist in the architectural or interior design applications is the appearance of a flat and frameless panel of light. In other words, the panel should appear fully illuminated to the eye without any dark boundary. As will be discussed further in sections below, this can enable novel designs as a plurality of panels are conjoined into a larger, uniformly operated luminaire.

One specific method to guide and mix light from LEDs in order to create less concentrated lighting is to inject the light rays or quanta from the source LEDs into a transparent or semi-transparent plastic material, such as a sheet of Poly Methyl Methacrylate (PMMA) or Polycarbonate (PC), that contains microstructures, such as small Titanium Oxide particles or microscopic structural bumps or indentations. Other materials for the semi-transparent material can be contemplated, such as glass, Styrene-Acrylonitrile or Allyl Diglycol Carbonate. Other materials or designs of microstructures can be contemplated, such as small air-bubbles, Zinc Oxide, white Kaolin clay, dimples or other laser-etched shapes, among others.

Once light enters the material of the panel, the light propagates inside the material, where the following set of steps can take place to any given ray or quantum of light along its pathway:

The light ray or quantum can collide with a Titanium Oxide particle, surface imperfections or other microstructure, upon which the light ray or quantum scatters by a scattering angle in an appreciably random manner, and continues to propagate in a new direction within the sheet of material.

The light ray or quantum can reach the interface between the panel material and the surrounding space at an angle less than a critical angle, and proceed to exit the material and propagate in the surrounding where it contributes to the illumination of the room, office or space in general.

The light ray or quantum can reach an interface between the panel material and an interior component of the luminaire at an angle less than a critical angle, and proceed to exit the material and either be fully absorbed, Stokes shifted to a longer wavelength, or reflected by the interior luminaire interface or component.

The light can reach the interface between the panel material and the surrounding space, or the interface between the panel material and the interior luminaire component at an angle greater than a critical angle, and be reflected back into the panel. This can be referred to as internal reflection. A reflection event can also lead to a degree of scattering, where the degree can range from nothing, similar to a perfect or near-perfect mirror, to complete, like from a mostly non-absorbing diffuse reflector like a white sheet of paper or marble.

The steps are provided as examples, and there may be more, less, different, or alternate steps.

The critical angle in the above enumeration is a function of the relative indices of refraction of the two materials that comprises a given interface. Snell's Law can be used to compute the critical angle. The relative indices of refraction of various materials are available in published reference tables, such as by Sultanova et al. in Acta Physica Polonica A, volume 116, 2009, pages 585-587. Or the relative indices of refraction can be measured for novel materials. The critical angle can be, but is not limited to, 39 degrees, 40 degrees, 42 degrees, and 45 degrees.

The light that exits the panel through the exterior surface of the luminaire and into the surrounding can be made to appear less concentrated than the LED sources, or fully uniform, as long as the following conditions hold for the plurality of pathways of the plurality of light rays or quanta: a number, greater than some threshold, of scattering and reflection events as described in (1) and (4) precede the exit event as described in (2), with a number, less than some threshold, of absorption events as described in (3) taking place.

The above conditions imply the following structural, optical and material relations: First, the shorter the distance the light rays or quanta propagate from their concentrated sources, the conditions of reduced concentration or degree of uniformity are less likely to hold, since the probability of scattering as described in (1) and (4) increases with the propagation distance in the light-transmitting body. In other words, below some distance from the LED sources, the light rays or quanta can be distributed visibly similar to how they are distributed at the LED sources.

Second, the greater the number of microstructures that are contained in a given distance of the light-transmitting body, the higher the probability of scattering as described in (1) and (4), but also the higher the probability of absorption events as described in (3). In other words, the placement of microstructures in the material can be adjusted to imply a greater density in some parts, but it can be at the cost of increased losses of light rays or quanta, which thus reduce the energy efficacy of the luminaire.

Third, the greater the area of the panel that is at an interface to a second material or interior component that fully or partially absorbs light rays or quanta, the higher the probability of absorption events, as described in (3), for a given distance of material.

The degree of optical uniformity, the energy efficacy, and thus operational efficacy, material specifications, as well as structural configurations of interior and optical components can therefore be linked through fundamental optical relations, as illustrated in the above description. In the sections to follow several luminaire constructions are described, including illustrative embodiments of the present innovation, which in different ways combine the structural, optical and material relations in order to attain a certain specified efficacy and appearance.

Configuration of Light Injection Point.

Given a panel of a material of optical properties as described above, and given an objective to attain optical output that is spread out and less concentrated than the LED sources by some threshold, the light from the LEDs can be injected from the back of the exterior surface of the panel, that is from an interior position, or from the edge of the exterior surface of the panel from some interior position, which is of a smaller surface area than the exterior surface. The two placements of the LED sources can be referred to as a back-lit configuration and an edge-lit configuration, respectively.

The back-lit configuration has been used in office lighting that uses a fluorescent tube light source. The fluorescent tube is behind a glass or plastic cover, where the cover is not transparent, rather filled with some particles or surface imperfections that scatter the light. The same configuration has been used with LED light sources, such as in U.S. Pat. No. 7,748,148, or the ILP6060B003 product sold and marketed by Integral-LED™ arm (https://www.integral-led.com/products/panels/panel-back-lit-600x600-25w-4000k-3500lm).

The same principle is used in many omnidirectional LED lamps, where a diffuser separates the LED sources and the surrounding, wherein densely packed microstructures in the diffuser creates the omnidirectional distribution after the light rays or quanta propagates in a mostly radial fashion through the curved diffuser.

In applications with requirements as illustrated in relation to FIG. 1 above, a frame is not necessary in order to conceal the light source from the human observer, since the light is spread out before exiting into the surrounding environment. However, the back-lit configuration can require the panel to be of a greater thickness 1104. The light rays or quanta propagate mostly in the orthogonal direction from the interior side of the panel 1103 through the material 1111 to the exterior surface 1102. Therefore, in order to increase the distance the light rays or quanta propagate, such that additional diffusion of the concentrated LED sources is accomplished, the thickness of the panel 1104 can be increased.

The edge-lit configuration can be used by placing the small LED sources at at least one of the thin edges of the panel material. The light rays or quanta mostly propagates parallel with the exterior surface of the panel material. As microstructures are encountered, the light rays or quanta can be significantly redirected and exit through the exterior surface. This approach has been used in other luminaires, like those in U.S. Pat. Nos. 8,128,253 and 9,110,209, or the EPY22-3030-7SR-21L product sold and marketed by GE Lighting™ (https://catalog.gelighting.com/luminaire/indoor-luminaires/recessed/lumination/f=ge-led-edgelit-panel/p=epy22-3030-75r-21l/d=0/?r=emea).

In applications with requirements as illustrated in relation to FIG. 1 above, the edge-lit configuration can be more easily combined with a thin panel than the back-lit approach. Because light propagates parallel with the longest dimension of the exterior surface 1102, rather than orthogonal to it, the typical propagation distance is relatively large. The exception is at surface elements very close to the LED sources, that is in the neighborhood of the edge of the panel. Therefore, the typical construction of edge-lit luminaires uses an opaque frame or additional material to block from view the exterior surface close to the LED sources, where otherwise concentrated light can be visible.

Both back-lit and edge-lit configurations can include optical events, such that light rays or quanta propagate through the luminaire without exiting the exterior surface of the panel. Illustrative examples of such events include: For the back-lit configuration, a number of the light rays or quanta can enter the panel material, but scatter at a very high angle and exit the panel in the direction of the interior side of the luminaire 1103. For the edge-lit configuration, a number of the light rays or quanta can enter the panel material, but not scatter at all, or only at certain angles relative a critical angle, and reach the opposite end of the panel from where they entered. Both illustrative examples of optical events can be ameliorated to a degree by additional optical and mechanical designs of the luminaire, including its interior parts, such that more light rays or quanta are further redirected towards the exterior surface.

Consequently, the back-lit and edge-lit configurations have both benefits and drawbacks with respect to the desired properties of a luminaire as described in relation to FIG. 1. Additional optical and structural designs are required in order to enable a luminaire with some or all of the beneficial properties as described above.

Thin and Frameless Luminaire Construction.

Frameless Panel Through Tessellation and Concealment.

In an illustrative embodiment, a light-transmitting body in the shape of a square panel of a transparent or semi-transparent material as described above, is physically divided into four smaller subunits in the shape of squares 1100, where the square-shapes have identical dimensions and are congruent with the larger square panel, see FIG. 2A. A luminaire is provided that includes at least one light-emitting diode (LED); a plurality of light-transmitting bodies. Each subunit includes a first surface through which light from at least one LED enters the light-transmitting body; a second surface through which light exits the light-transmitting body; and a core coupled to both the first surface and the second surface, such that light propagates through the core between the first surface and the second surface.

The shapes, in concert, are arranged such that a recursive relation on indices of the plurality of light-transmitting bodies is applied, such that any second surface of a light-transmitting body covers from above one and only one first surface and a segment of the core of another light-transmitting body, and that any first surface and the segment of the core of a light-transmitting body is disposed in a cavity underneath one and only one second surface of another light-transmitting body.

Each subunit of the light-transmitting body is slightly tilted relative the neighboring subunits, see FIG. 2B. Accordingly, the first surface is situated below a plane of the second surface; and a first light-transmitting body in the plurality of light-transmitting bodies is arranged in relation to at least one second light-transmitting body in the plurality of light-transmitting bodies. In particular, a first light-transmitting body in the plurality of light-transmitting bodies is tessellated in relation to at least one second light-transmitting body in the plurality of light-transmitting bodies.

Each subunit is elongated by some amount along one of its dimensions, such as 5 millimeters or 20 millimeters. The exterior surfaces of the subunits are therefore in the shapes of a rectangle, and because of their small yet finite thickness, each subunit is a light-transmitting body shaped as a rectangular cuboid.

The subunits are placed adjacent to each other, such that the elongated segment of a first subunit is placed underneath the surface facing the interior side 1103 of a second adjacent subunit, where that placement is possible due to the aforementioned tilting of the subunits, see FIG. 2C. The elongated segment that is covered is therefore concealed from a human observer when the exterior surfaces 1102 of the assembled subunits are viewed from any distance and from a direction at an angle 1106, such as 0, 5, 30, 45, 80 or 89 degrees, relative to the normal vector of the larger square surface.

Furthermore, the concealed cavity, that the tilting of the subunits creates on the interior side 1103 of the panel, can be used to house electronics and the LEDs, which once electrically powered emit light rays or quanta that are injected into the adjacent subunit, via at least one of its relatively thin edges. Once inside the light-transmitting body, the light rays or quanta propagates through the core of the light-transmitting body until an optical event redirects the light rays or quanta to exit through another surface, predominately the exterior surface.

The concealed cavity, in some embodiments, is a depressed portion that includes the surface of an adjacent light-transmitting body that that light enters the adjacent light-transmitting body. The depressed portion is thus concealed from view at an acute angle relative the normal vector of any of the second surfaces of the light-transmitting bodies of the plurality of light-transmitting bodies.

In FIG. 2B, 4 units are shown, and in a preferred embodiment, the portions are tessellated over one another at various concealed portions. In a preferred embodiment, the tessellations are provided in a continuous shape, wherein all of the depressed portions of the light-transmitting bodies are concealed by another light-transmitting body. For example, a circle, triangle, square, or other shape can be provided wherein each light-transmitting body covers another light-transmitting body and all light-transmitting bodies are covered. In a specific example, a first light-transmitting body connects with a second, which connects with a third, and so-forth, and the last light-transmitting body also conceals the depressed portion of the first light-transmitting body (e.g., similar to how a cardboard box can be closed by arranging the flaps).

The tessellations are not restricted to a continuous shape (e.g., a triangle, a square). In another preferred embodiment, the portions overlap one another and the light-transmitting bodies are spatially arranged as a long strip, and the first and last light-transmitting bodies of the strip are only connected to one other light-transmitting body, such that the depressed portions of at least one of the light-transmitting bodies is not covered by another light-transmitting body. In this preferred embodiment, the non-covered portions may be covered through another mechanism, or simply left dark (e.g., as part of the design).

The construction thus obtained conceals from the human observer the electronics and the LEDs, which may reside within the concealed cavity. There may be other components stored therein. Accordingly, the LED, the first surfaces and segments of the core of the plurality of light-transmitting bodies are concealed as the luminaire is electrically powered and is viewed from an acute angle relative the normal vector of any of the second surfaces of the light-transmitting bodies of the plurality of light-transmitting bodies.

It can also conceal the segment of the core of the light-transmitting body of transparent or semi-transparent material that is the closest to the surface elements to the point of injection of light rays or quanta.

This short section can be part of, or the whole of, the elongated section described in the previous paragraph. The segment is adapted such that, the light from the concentrated LED sources propagates a distance greater than or equal to a threshold and undergoes optical changes greater than or equal to a threshold through scattering and other optical transformations, such that beyond a threshold separation from the LED sources, the light is adequately mixed by a specified standard for the architectural or interior design application.

Because the concealment of the segment of the core of the first subunit is done by a partially overlapping second subunit of transparent or semi-transparent material, which can be illuminated through the same means of light mixing as the first subunit, the human observer of the first subunit of semi-transparent material can see only light that is adequately mixed by a specified standard for the architectural or interior design application, and can do so absent any frame or other non-transparent concealment of parts of the first subunit.

This relation vis-à-vis the human observer holds for all light-transmitting body subunits of the luminaire in the following manner: Part of the visible panel material of the first subunit covers both the LEDs that inject light into the panel material of the second subunit, and the segment of panel material of the second subunit wherein the light mixing takes place.

Part of the visible panel material of the second subunit covers both the LEDs that inject light into the panel material of the third subunit, and the segment of panel material of the third subunit wherein the light mixing takes place. Part of the visible panel material of the third subunit covers both the LEDs that inject light into the panel material of the fourth subunit, and the segment of panel material of the fourth subunit wherein the light mixing takes place.

Finally, part of the visible panel material of the fourth subunit covers both the LEDs that inject light into the panel material of the first subunit, and the segment of panel material of the first subunit wherein the light mixing takes place. The final closure relation is guaranteed by the 90-degree rotational geometrical transformation that is employed from one rectangular subunit to the next, see FIG. 2B for an illustration.

Because of the small dimensions of the LEDs, the tilt angle for each subunit can be small, 5 degrees, 1 degree or for sufficiently extended squares relative the LEDs, smaller than 1 degree. The tilt angle can impart desirable aesthetic qualities to the luminaire and hence be made larger than the minimum implied by the spatial constraints of the electronics and LEDs.

Further mechanical components can be contemplated to make the angle adjustable after the luminaire has been installed by the user. That includes hinges that change their configuration as the smaller squares are pushed above some force threshold. That includes cogs that adjust as they receive an electronic control signal that specifies a new tilt angle.

The method of manufacturing the illustrative luminaire of FIGS. 2A-2C can follow a different sequence than described above. That includes, but is not limited to, variations to the method as follows: Each light-transmitting body subunits can be manufactured as a separate piece of material of rectangular cuboid form rather than obtained from elongation of squares obtained from the division of a larger body.

The entire assembled unit with concealed cavities can be manufactured from one injection mold or a single instance of three-dimensional printing. The assembly of the subunits can be done by attaching them with glue, screws, clips or some other means at the interior side to a frame or foundation. Other methods of assembling the four subunits and the LEDs in a configuration as specified above and illustrated in FIGS. 2A-2C can be contemplated.

In another embodiment, each of the smaller subunits are not rectangular cuboids, rather the larger surface facing the interior of the luminaire is at an angle relative the larger exterior surface through which the light rays or quanta exit the luminaire into the surrounding space or room.

The angle of the interior surface of the panel is such that at a greater separation from the LED light sources, the panel can be thinner, see the side-view of the illustrative embodiment in FIG. 2C. In other words, each light-transmitting body subunit is tapered such that it is thinner in sections farther away from the LEDs that inject the light rays or quanta into the panel material of said subunit, than in sections closer to the LEDs that inject the light rays or quanta into the panel material of said subunit.

The angle can be small such that at the farthest point away from the LEDs, the panel is still of an appreciably finite width. The angle can be somewhat larger such that at the farthest point away from the LEDs, the panel has a sharp edge where the thickness is appreciably infinitesimal. The angle can be, but is not limited to, less than one degree, one degree, and five degrees.

The effect of the tapering can be visualized as a narrowing funnel where fewer light rays or quanta are able to propagate parallel with the two larger surfaces, the interior and exterior ones, as the light rays or quanta propagate farther away from the LED sources. Because of reflective properties of the interior surface and its angle, a plurality of light rays or quanta that encounter said surface can be reflected and redirected such that they encounter the opposite exterior surface at an angle in relation to the critical angle of that interface, such that the light rays or quanta exit the panel material into the surrounding and contributes to the illumination of the room or space.

In embodiments where the angle is such that the farthest point away from the LEDs is of an appreciable finite width, the narrow interface at that end of the panel, orthogonal to the large exterior surface, can be covered with reflective material. The effect of this material is that light rays or quanta can be reflected back into the panel material and through subsequent scattering or reflection events exit into the surrounding. This can be advantageous in that it further enhances the uniformity of the light emitted from the panel or that fewer light rays or quanta are lost to absorption events. In embodiments where the angle is such that the farthest point away from the LEDs is of an appreciably infinitesimal width, all light will have been either emitted or absorbed by the far end of the panel.

Therefore, through the optimization of the angle of the tapering of the interior surface, the choice of a reflective material, the placement of microstructures, an appreciably uniform illuminated surface can be obtained with little to no losses of light rays or quanta following their emission from the LED sources.

In some embodiments, the interior surface can be tapered, such that it is thinning in a manner non-linear with respect to separation from the LED light sources. The relation of thickness of the panel material and the separation can be parabolic, sigmoidal or follow any other functional form. The effect of the thinning can also in these embodiments be visualized as a funnel as described above, with qualitatively the same optical effects.

In some embodiments the light-transmitting body subunits are not at a tilt angle relative each other. Rather the subunits are constructed such that, the surface at the edge into which light is injected by the LEDs is situated at a depressed position relative the exterior surface. Because the point of injection is lower, a second subunit adjacent to the first subunit can conceal the surface at the edge of the first subunit into which light is injected without tilting one or both of the subunits, as in the previously described embodiment. In FIGS. 3A-3D, four embodiments of the light-transmitting body subunit 1100 of a larger flat luminaire 1101 are illustrated, shown as intersections from a side-view. All four illustrative embodiments have the surface of light injection 1433 at a depressed position relative the larger exterior surface 1102 through which the injected light rays and quanta exit into the surrounding space. The four embodiments differ with respect to the mechanism and construction by which the light propagates and transforms between injection and exit, to be described further below.

A neighboring subunit overlaps with the LEDs 1401 as well as with a segment of the core 1421 of the light-transmitting body subunit of a panel shape, a segment in which light rays or quanta mixes from the concentrated sources. Hence the LEDs and the segment of the core is within a cavity and thus concealed from the human observer. The overlapping pattern is repeated for all subunits: Part of the visible panel of the first subunit covers both the LEDs that inject light into the panel of the second subunit, and the segment of the core of the panel of the second subunit wherein light mixing takes place. Part of the visible panel of the second subunit covers both the LEDs that inject light into the panel of the third subunit, and the segment of the core of the panel of the third subunit wherein light mixing takes place. Part of the visible panel of the third subunit covers both the LEDs that inject light into the panel material of the fourth subunit, and the segment of the core of the panel of the fourth subunit wherein light mixing takes place.

Finally, part of the visible panel of the fourth subunit covers both the LEDs that inject light into the panel of the first subunit, and the segment of the core of the panel of the first subunit wherein light mixing takes place. The final closure relation is guaranteed by the 90-degree rotational geometrical transformation that is employed from one subunit to the other. Consequently, to the human observer, the construction can appear as one larger illuminated square without frame or other dark surface elements, and with a luminous emittance that appear less concentrated than a threshold.

Figure 3B:
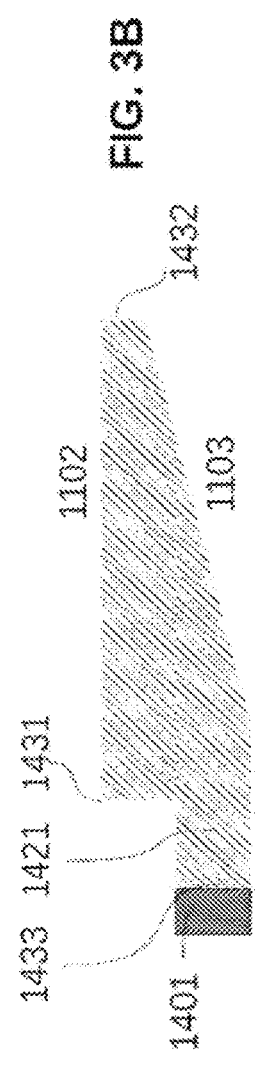

In some embodiments, part of the entire interior surface 1103 is at an angle relative the exterior surface 1102 that faces the surrounding environment, see FIG. 3B. By a similar or identical mechanism as described for the embodiments in relation to FIG. 2C, the surface facing the interior parts reflects and redirects light rays or quanta towards the surrounding environment. The exact angle is a parameter that can be set to optimally combine light uniformity and energy efficiency considering all or some of the other factors of the optical device, as described for the previous embodiments in FIG. 2C.

The edge 1431 of the large exterior surface 1102, which is the closest to the LEDs 1401, can be at a sharp angle relative the surface of light injection 1433 in the embodiments illustrated in FIG. 3A and FIG. 3B. This can complicate the attainment of an objective of an even spread of light in the optical material, because nearby surface elements of said edge of the panel can only be reached by light rays or quanta through rare reflection or scattering events that bend or otherwise alter the path of the light considerably compared to the path the light rays or quanta are emitted in from the LEDs. Such events can include scattering of a scattering angle that is greater than 60 degrees, 80 degrees or 90 degrees.

Figure 3C:
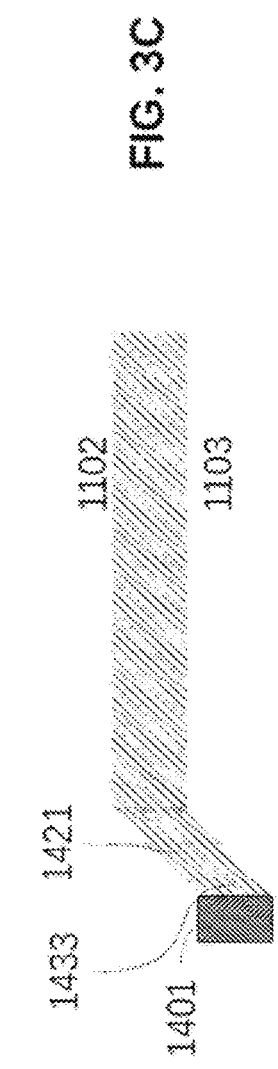
Figure 3D:
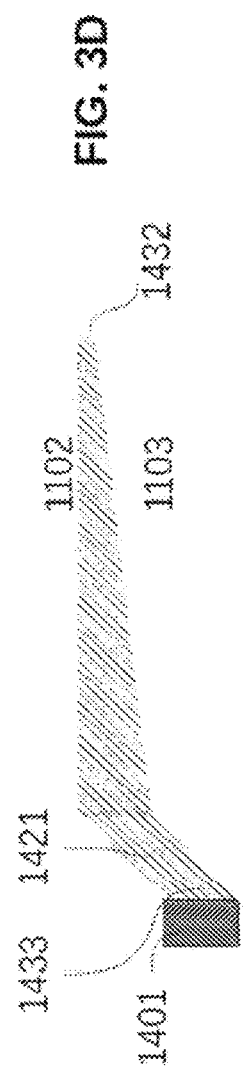

Therefore, in some embodiments, the sharp angle is removed by the smooth continuous joining of the depressed section of the panel, where light injection is done 1433, to the section of the panel with an interface to the surrounding 1102, see FIG. 3C and FIG. 3D. The segment of the core 1421 between these two parts of the panel can be any of a variety of shapes, such as but not limited to polygonal, straight, sigmoidal or some general curve moving upwards from one end to the other. Each surface element of the large exterior surface 1102 can therefore be reached by light rays or quanta that have not necessarily undergone any major redirection by reflection or scattering, which implies there are more paths of that kind.

In the segment of the core 1421 of the light-transmitting body, the light rays or quanta are mixed while concealed from view since a neighboring panel overlaps with it in a pattern as described above.

The light rays or quanta propagate through the core of the light-transmitting body with little or no loss because they mostly reflect against the interior interface by the physical mechanism of internal reflection, as described above. The lesser the bending or curvature of the segment of the core 1421, the lower the losses of light rays and quanta can be in this part. On the other hand, the lesser the bending or curvature of the segment of the core, either the relative height difference between the exterior surface 1102 and the concealed parts where the LEDs 1401 and injection surface 1433 are, is smaller, or the LEDs 1401 and injection surface 1433 of the given panel is farther removed from the part of the panel with the exterior surface 1102 to the surrounding. Both variations can further constrain the mechanical assembly of components of the luminaire. Therefore the degree of bending or curvature of the segment of the core is a variable of this particular embodiment that can be optimized to given objectives of light quality, efficiency, product operational economy and complexity of product manufacturing and assembly. The illustrative embodiments in FIGS. 3A-3D illustrate principles in designing the shape of the light-transmitting body, which can be mixed or combined in order to meet given objectives.

The segment of the core 1421 can be a part of a continuously molded material that comprises the core, where the molding includes the various bends and curves that are designed as described above The continuously molded material can be the plastic PMMA. The segment of the core 1421 can be a distinct piece of optical material, which has been bent or curved separately from the rest of the core of the light-transmitting body, wherein the segment of the core is joined to the LEDs on the one side, and the rest of the light-transmitting body with an exterior surface to the surrounding on the other side. The latter design can enable the panel subunit 1100 to be manufactured as a flat object, rather than with a specified curvature, which can complicate injection molding or other processes of manufacturing. The latter design introduces one or a plurality of additional interfaces between the segment of the core and the other optical parts and LEDs. At an interface like this, there can be an increased probability of reflection events and other losses of light rays or quanta as they encounter the interface between the two optical parts. Through an appropriate selection of materials and a careful joining of the segment of the core to the rest of the panel such as, no air bubbles, dirt or misalignment are introduced, the probability of losses of this kind can be reduced. The segment of the core can in these embodiments be comprised of fiber optics.

In other embodiments the continuous joining of the depressed part for light injection can be combined with the feature of an interior interface 1103 at an angle, see FIG. 3D. This has the same effect on the injected light rays or quanta as a tapered interior interface has for the other embodiments described above with an interior interface like that.

The four illustrative embodiments shown in FIGS. 3A-3D should not be understood as an exhaustive enumeration of possible designs. Rather, they clearly illustrate and represent limiting cases of the structure of the subunit. Other embodiments that combines features of all four illustrative embodiments, through an abstract process of interpolation, can be contemplated. One embodiment of this kind is described next.

In FIG. 4A-4C a particular illustrative embodiment of the light-transmitting body subunit is shown from three different perspectives. The perspective of the subunit as seen from the exterior view is in FIG. 4A. The part 1102 that is illuminated when the subunit is in operation and is visible to the human observer by a combination of optical processes as described above, is of some dimension 2102. In the particular embodiment it is the largest dimension of the subunit and it can be, but is not limited to, 70 millimeters, 73.6 millimeters, 80 millimeters or 100 millimeters. The light rays or quanta that illuminate the exterior surface 1102 have been mixed in the segment of the core 1421 of the light-transmitting body. The source of the light rays or quanta can be three LEDs, which are injecting light into the light-transmitting body through three distinct parts 1433 of the thin surface at the edge. The farthest point away from the LED sources 1432 is of a relatively small dimension and can be prepared such that it is reflective. The thickness of the panel at 1432 can be, but is not limited to, 0.5 millimeters, 1 millimeter or 3 millimeters.

The segment of the core 1421 of the subunit shown in FIG. 4A is of a complex shape along its most extended dimension. The dimension 2421 of the segment that extends the furthest from the exterior surface 1102 can be, but is not limited to, 15 millimeters, 18.8 millimeters or 20 millimeters. However, there are other parts of the edge of the segment of the core 1421, which are closer to the exterior surface. Furthermore, the injection surfaces 1433 are at varying angles relative the sides of the exterior surface. For this reason, the dominant direction the three distinct LED sources inject the light rays or quanta into the panel material will be different. The thickness of the injection surfaces, or their shortest dimension, is adjusted to at least fit the dimensions of the LED sources. This dimension can be, but is not limited to, 1.51 millimeters, 3 millimeters or 4.66 millimeters. In some embodiments the dimensions of the plurality of injection surfaces 1433 can differ between any two injection surfaces in the plurality of injection surfaces.

The thickness of the light-transmitting body can also vary, as seen in FIG. 4B. The thickness is the greatest near the LED sources. The thickness can be, but is not limited to, 4 millimeters, 4.66 millimeters or 6 millimeters. The varying thickness can provide a narrowing of the optical funnel, as described in relation to FIG. 3B and FIG. 3D. The tapered surface facing the interior 1103 can alter at what distance of propagation within the core given light rays or quanta exit through the exterior surface 1102. The varying thickness can also be justified by mechanical constraints implied by that a first panel subunit will in part overlap with a second panel subunit, such that the segment of the core 1421 is concealed from the perspective of the human observer. In particular, that means that at least a section of the panel subunit near the far end 1432 has to be of a thickness such that when positioned over the segment of the core of another panel subunit, the two thicknesses added together are below a threshold. Other electrical and mechanical factors of the luminaire design can constrain the thickness and shape in general of the interior surface 1103 of the panel subunit. Other factors related to the manufacturing of the panel subunit can constrain the shape.

The method by which the shape of the segment of the core 1421 and the shape and angle of the injection surfaces are obtained, can be as follows. The degree of mixing that is required in order to meet specifications with respect to the luminous emittance from the exterior surface 1102, imply for a certain material specification, a minimum distance of propagation that is required between the injection surface 1433 and the part of the panel, that is visible to the human observer, and that receives an appreciable amount of light rays or quanta from said injection surface. An injection surface at an angle means the distance of propagation is greater than had the light been injected at a surface orthogonal to the shortest distance between the two ends of the segment of the core. Furthermore, the angle of the injection surface 1433 affects which surface elements 1201 of the exterior surface 1102 that receives the most light from which LED source. The sections of the panel subunit which are relatively thin for one or several reasons enumerated in the previous paragraph, can require more light directed towards it, since light rays or quanta are at a higher probability of exiting the panel on their path to said sections. An optical output that meets the specifications by the architectural or interior design application can be obtained by the simultaneous consideration of the above structural factors, employing means, such as but not limited to, optical computer simulations, prototyping and laboratory testing. Thus a light-transmitting body design is obtained, including the shape of the segment of the core 1421 and the placement of the injection surface 1433.

Figure 5:
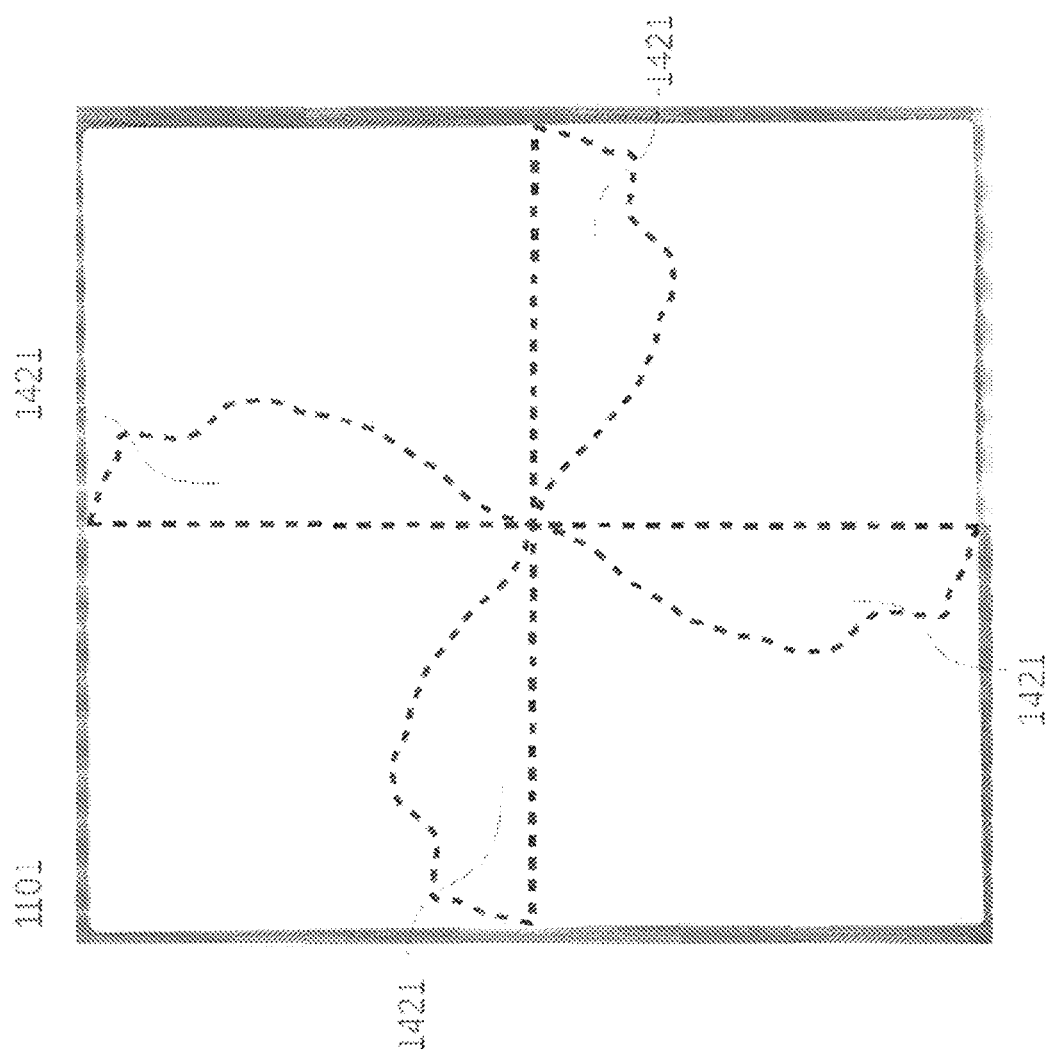
FIG. 5 shows a photograph of the exterior surface of a luminaire as it can be viewed by a human observer, created from a plurality of four panels of optical material, embodied as in FIGS. 4A, 4B, 4C, with the concealed edges outlined as dashed lines.

In FIG. 5 a photograph of a complete luminaire 1101 is shown, obtained through the combination of four overlapping panel subunits as shown in FIG. 4A-4C. The photograph is taken of the exterior surface as it can be seen by a human observer. In FIG. 5 dashed lines are added to show the outline of the segment of the core 1421 in the shape and specification as described in relation to FIG. 4A-4C. The dashed lines are not visible by the user, neither is the segment of the core of the light-transmitting bodies, and the lines are included in FIG. 5 to clarify the relation between the luminaire and the subunit in FIG. 4A-4C. Despite the highly concentrated twelve total LED sources in the particular luminaire of FIG. 5, which generate the light rays or quanta, the optical design is successful in spreading out the light and hence to create a luminaire of a luminous emittance that can be directly viewed by a human observer without unpleasant experiences of glare or other undesired light qualities.

For reference, the dimensions of the luminaire shown in FIG. 5 are: square shape with sides of length 150 millimeters. The thickness is 9.8 millimeters, which includes the thickness of the overlapping panel subunits as well as a back panel that houses the electronics, including an internal electrical driver to power the luminaire, as well as provide mechanical support, such that the luminaire can be mounted against a surface. Other sizes and shapes of the luminaire can be obtained by variations of the components, including the dimensions, but not necessarily the shape, of the panel light-transmitting body subunits.

In FIGS. 4A-4C a small structure without optical function is shown 1439. These two small pegs can help in the assembly of the luminaire. The tolerance for the overlapping of panel subunits can be small, and therefore it can be helpful to include a small structure to guide the fitting of subunits to a complementary indentation in an interior panel of the luminaire.

Common to the illustrative embodiments in FIGS. 3A-3D and FIGS. 4A-4C and FIG. 5, is that as light rays or quanta are injected into an optical material through a surface, which is situated below the exterior surface of the panel subunit, said light rays or quanta are guided through a section of some shape and material composition in which the light mixes, such that the degree of light concentration in any surface element is reduced below a specified threshold relative the light concentration at the LED sources, while all or some of said light rays or quanta propagate into the section of the panel subunit with an exterior surface, through which the light can exit by one or a plurality of optical mechanisms and thus contribute to the illumination of the room or space.

An overlapping pattern is repeated for all subunits created by the described method: Part of the visible panel of the first subunit covers both the LEDs that inject light into the panel of the second subunit, and the segment of the core of the panel of the second subunit wherein light mixing takes place. Part of the visible panel of the second subunit covers both the LEDs that inject light into the panel of the third subunit, and the segment of the core of the panel of the third subunit wherein light mixing takes place. Part of the visible panel of the third subunit covers both the LEDs that inject light into the panel material of the fourth subunit, and the segment of the core of the panel of the fourth subunit wherein light mixing takes place.

Finally, part of the visible panel of the fourth subunit covers both the LEDs that inject light into the panel of the first subunit, and the segment of the core of the panel of the first subunit wherein light mixing takes place. The final closure relation is guaranteed by the 90-degree rotational geometric transformation that is employed from one subunit to the other. Consequently, to the human observer, the construction can appear as one larger illuminated square without frame or other dark surface elements, and with a luminous emittance that appear less concentrated than a threshold.

The embodiments of the innovation has so far been described in terms of one larger square apparently divided, or tessellated, into four smaller and partially overlapping congruent squares. Other embodiments of the innovation can be contemplated, which employs the disclosed method of constructing subunits and installing these in a particular geometric relation to each other in order to create a thin luminaire panel of some shape with light output less concentrated than a threshold, without a frame or other dark, or non-radiant, surface elements.

Figure 6C:
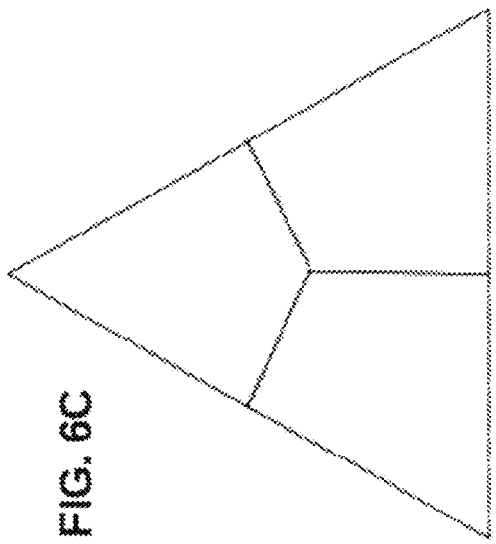
FIGS. 6A, 6B, 6C, 6D illustrate possible tessellations of a larger panel luminaire into a plurality of smaller panels that are each illuminated uniformly through LEDs and a mixing part concealed from view, according to some embodiments.
Figure 6D:
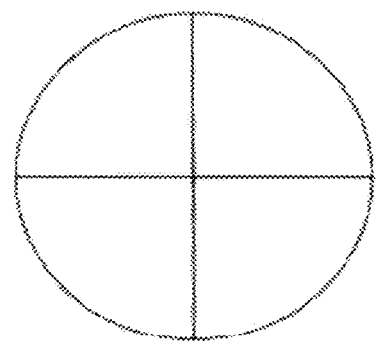
Figure 6A:
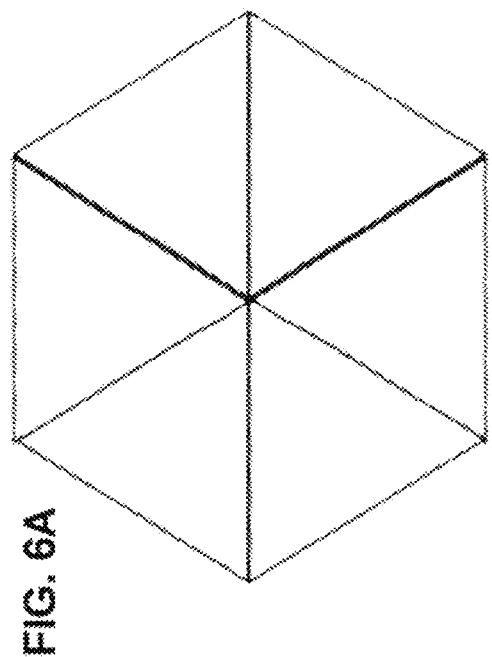
Figure 6B:
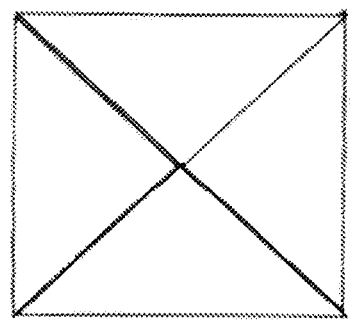

A hexagonal structure can be tessellated into six equilateral triangles, wherein each triangle is illuminated by LEDs that are hidden by a neighboring triangle, see FIG. 6A. A square can be tessellated into four triangles, wherein each triangle is illuminated by LEDs that are hidden by a neighboring triangle, see FIG. 6B.

A triangle can be tessellated into three identical quadrilateral polygons, wherein each quadrilateral polygon is illuminated by LEDs that are hidden by a neighboring quadrilateral polygon, see FIG. 6C. Any other polygon can be tessellated into two or more smaller polygons, wherein the smaller polygons are illuminated by LEDs that are hidden by a neighboring polygon.

A circular disk can be tessellated into four quarter circles, wherein each quarter circle is illuminated by LEDs that are hidden by a neighboring quarter circle, see FIG. 6D. Additional tessellations can be contemplated.

All of the contemplated embodiments can use the method of slightly tilted subunit structures in order to create the concealed cavity, in which to house the LEDs and the segment of the core of the light-transmitting body in which adequate light mixing is attained.

All of these contemplated embodiments can use the method of bent or curved subunit structures in order to create the concealed cavity, in which to house the LEDs and the segment of the core of the light-transmitting body in which adequate light mixing is attained.

In other embodiments the LED light sources can emit different colored light, rather than white light of identical optical spectra. By varying the relative current magnitudes for the plurality of LEDs, the light that is emitted from the luminaire can vary in hue and saturation, as instructed by color theory, including but not limited to the color models of RGB, CMYK, HSV, HSL, and CIE XYZ.

The colored light sources can further exacerbate the problem of obtaining a uniform appearance of the light from the luminaire since the light rays or quanta can be more heterogeneous with respect to what a human observer can resolve as visually distinct, than what is the case for LED sources that emit an identical, or nearly identical white light. The invention can still be used for colored LED sources. Through a sufficient number of scattering events attained by possibly a greater distance of propagation in a concealed segment between the LED sources and the part with an exterior surface, or by a possibly general increase of the density of microstructures in the whole or parts of the light-transmitting body, adequate mixing can be obtained by the same optical mechanisms (1)-(4) as described above, for color LEDs as well as white LEDs, or a combination thereof.

Frameless Panel Through Cover and Light Cloak.

Figure 7:
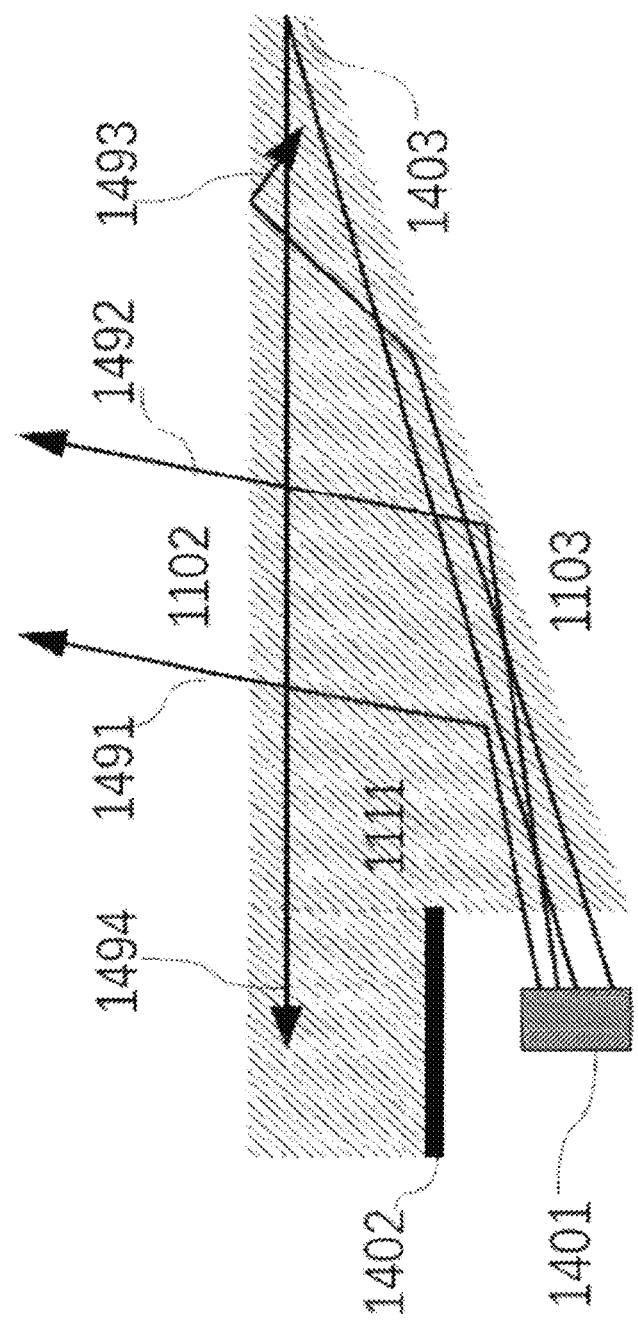
FIG. 7 shows a side view of an intersection of an embodiment wherein the concentrated light source is covered by an opaque structure that in turn is cloaked in light that through optical transformations, such as reflection and scattering, is emitted through the exterior surface at a surface element directly above the opaque material. The illustration includes a selection of light rays or quanta that are transformed following their emission from the concentrated source, such that a much less concentrated and even luminous emittance is obtained from the exterior surface, according to some embodiments.

An appreciably flat and frameless luminaire, with an illuminated surface such that, the light from the concentrated sources can be more spread out than a threshold, can be obtained as illustrated in FIG. 7. The luminaire of an embodiment includes at least one light-emitting diode (LED); one light-transmitting body; the light-transmitting body including: a first surface through which light from the at least one LED enters the light-transmitting body; a second surface through which light exits the light-transmitting body; and a core coupled to both a first surface and a second surface, such that light can propagate between a first surface and a second surface.

The luminaire is shown in an intersected side-view, with only one half of the luminaire in the illustration.

As described below, there is at least one opaque layer which blocks light incident thereto and microstructures configured to redirect light incident in relation to at least one of the at least one first surface, the second surface, and the core. The first surface is situated below the plane of the second surface and the opaque layer is positioned relative the first surface and the LED, such that no light from the LED enters the light-transmitting body by any surface other than the first surface. At least one segment of the core of the light-transmitting body covers from above at least one cavity in which the LED, the first surface and the opaque layer is contained, and at least one segment of the second surface is disposed above said segment of the core such that, the LED, the opaque layer, the plurality of first surfaces are concealed as the luminaire is electrically powered and is viewed from an acute angle relative the normal vector of the second surface.

The luminaire is in part comprised of one or a plurality of LED light sources 1401 that are placed at or near the middle of the luminaire under an opaque cover surface 1402 of some size, and where the LEDs are oriented, such that they mostly emit light rays or quanta parallel to said opaque surface, wherein the light rays or quanta thus emitted enters a surface to the light-transmitting body and proceed to propagate through the core of the light-transmitting body, comprised of a transparent or semi-transparent material 1111, such as PMMA, PC or air. The light-transmitting body can have an interior part or surface 1103 (e.g., the first surface), which is at an angle, such that the space in which the light propagates is increasingly reduced farther away from the LED sources. This can be visualized as a funnel that is narrowing farther away from the LEDs.

Light rays or quanta 1492 that encounter the interior surface can be reflected and redirected in a plurality of angles at a plurality of separations from the LED sources. The plurality of angles includes angles that redirect the light rays or quanta away from the interior surface, such that the light rays or quanta propagate through the core towards an exterior surface 1102 of the light-transmitting body (e.g., the second surface). Light rays or quanta that encounter the exterior surface at an angle below the critical angle for internal reflection, exits through the exterior surface 1102 to become part of the illumination of the room or space in general. The exterior surface 1102 is situated above the interior surface 1103.

In some embodiments the light-transmitting body contains microstructures placed in set locations or areas of certain density, where light rays or quanta 1491 that propagate close to at least one microstructure are redirected. These redirected light rays or quanta can encounter the exterior surface and exit into the surrounding space. The microstructures can be comprised of Titanium Oxide particles or microscopic indentations. There can also be light rays or quanta 1493 that are redirected by reflection against the interior surface or by a microstructure, or by some other means, which upon reaching the exterior surface 1102 do so at an angle greater than a critical angle, and an internal reflection by a mechanism as described above takes place. The light rays or quanta continue to propagate within the core of the light-transmitting body. Subsequent scattering or reflection events can for said light rays or quanta redirect them such that they exit the exterior surface upon a second, third, fourth or higher, encounter.

Other materials for the semi-transparent material can be contemplated, such as glass, Styrene-Acrylonitrile or Allyl Diglycol Carbonate. Other materials or designs of microstructures can be contemplated, such as small air-bubbles, Zinc Oxide, white Kaolin clay, dimples or other laser-etched shapes, among others. The light rays or quanta that have been reflected and have not been absorbed or otherwise lost, can thus enter the panel in order to become further mixed and evenly distributed by one or a plurality of the optical mechanisms described in an earlier section.

In a preferred embodiment, the light that exits the flat and thin panel can therefore be free of any optical hot spots or band structure that can be undesirable in applications in architecture or interior design.

In an alternate embodiment, the light that exits the flat and thin panel is provided having a distribution across the exterior surface, but the light that exits may retain uneven lighting due to the underlying opaque surface (e.g., some light is able to exit proximate the exterior surface to the opaque surface). In the alternate embodiment, the uneven lighting, despite not being able to provide full lighting over at the exterior surface proximate the opaque surface, may yet be desirable, for example, to ultimately be controlled to provide a light pattern akin to a "tie dyed shirt".

The interior surface and the exterior surface include structural features that cause internal reflection. These structural features can include one or both of the interior surface and the exterior surface being angled, having microstructures disposed thereon, among others. To provide lighting over the cover surface 1402, at least some first light rays propagate through the light-transmitting body, reflect off the first surface and exit the second surface directly, and at least some second light rays propagate through the light-transmitting body, reflect internally within the core and exit the second surface at a position proximate to the opaque surface 1402. Various embodiments are described below.

Some of the light rays or quanta 1494 that are injected into the panel material can propagate to an edge of the luminaire without being redirected by reflection at the interior surface, internal reflection, or scattering, as described above. A reflective surface orthogonal to the opaque cover surface can be added to an edge of the light-transmitting body 1403. Light rays or quanta that are reflected at this edge can propagate back through the core towards the LED sources 1401 and the cover surface 1402. Some of these light rays or quanta can propagate through the segment of the core above the opaque cover surface.

Light rays or quanta that propagate within the segment of the core of the light-transmitting body above the opaque cover surface 1402 can be redirected by a microstructure (e.g., the opaque cover surface 1402, in an embodiment, has a microstructure deposited thereon). Optical events as described above can lead to that these light rays or quanta exit the panel material through the exterior surface.

The surface element of the exterior surface that therefore becomes illuminated is above the opaque cover surface.

Consequently, the opaque cover surface as well as the LEDs and other electronics housed in the cavity beneath the cover surface, are cloaked by light from the perspective of the human observer (e.g., at an angle normal to the exterior surface 1102). Therefore, an optimization of the variables of the luminaire construction, such as but not limited to, placement of LEDs, extent of the opaque cover surface, angle of the interior surface relative the opaque cover surface, the type and spatial distribution of microstructures in the core of and at surfaces of the light-transmitting body, the dimension of the edges as well as the type of reflective material at said edges, and the thickness of the optical panel in particular for the segment of the core above the opaque cover surface, can instruct how to create a thin illuminated panel without any visible non-transparent frame or dark surface element, wherein the relative luminous emittance between any set of surface elements of the exterior surface are below some threshold.

Figure 8:
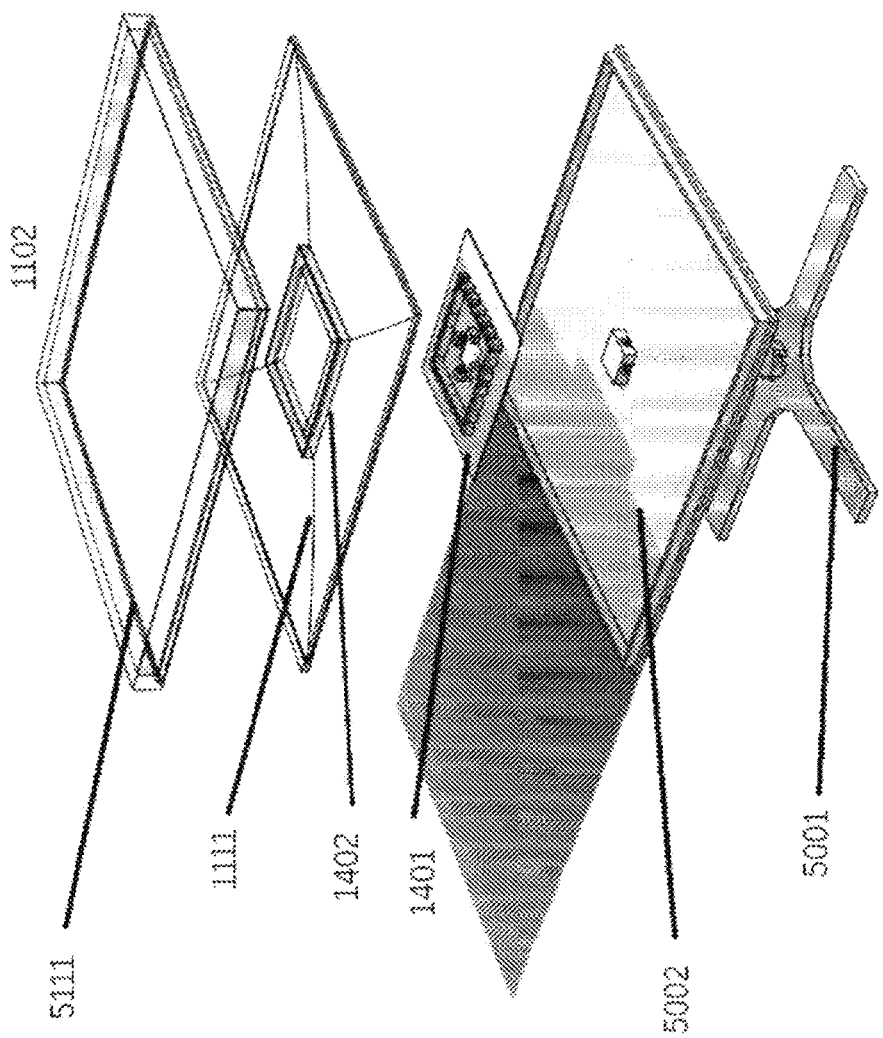
FIG. 8 shows an exploded view of an embodiment wherein the LED light source is placed at the center of the luminaire, where the source is concealed in the orthogonal direction of the largest surface of the luminaire by an opaque structure, while most light enters the luminaire parallel with the largest surface, according to some embodiments. A portion of the construction is also shown to be at a reflective surface at an angle, which redirect the light to mostly radiate orthogonal to the largest surface.

In FIG. 8 an illustrative embodiment of a complete luminaire is shown. The LEDs 1401 are placed as a cluster at the center of the luminaire. The LEDs can be arranged on the circumference of a square, as shown in FIG. 8, or in other embodiments on the circumference of a circle any other two-dimensional shape.

The LED cluster emits light rays or quanta mostly in a plane parallel with the exterior surface 1102 and in approximately all directions from the center within said plane. The opaque cover surface 1402 blocks a direct path for the light rays or quanta from the LEDs 1401 to the exterior surface 1102. The opaque cover surface 1402 is of a relatively small size compared to the surface area of the luminaire.

The illustrative embodiment shown in FIG. 8 contains additional parts, such as the mechanical support on the interior side, like a back-tray 5002 and a mechanical mount 5001 to attach the luminaire to a wall, ceiling or other surface in the room. Other means to mechanically support and mount the luminaire can be contemplated, and are not essential to the optical design. The illustration also includes an additional layer of optical transformation by a diffuser 5111, which also provides mechanical support. The optical aspects of this part is a continuation of the main optical material 1111, and can therefore in all descriptions be treated as part of the light-transmitting body. The particular embodiment shown in FIG. 8 has therefore divided the functionality of optical transformations into two parts joined upon assembly of the luminaire, where one part in addition to optical functionality also serves a mechanical function for the safe operation of the luminaire.

A luminaire of the construction described above and illustrated in FIG. 7 and FIG. 8 can be very thin, unlike other light panels, which also place the LEDs behind the panel, the so-called back-lit design. The reason is that by orienting the LEDs to mostly emit parallel with the exterior surface of the luminaire facing the surrounding, rather than orthogonally to the exterior surface, the distance of propagation for the light rays or quanta between the concentrated LED sources and the surface elements through which the light rays or quanta exit into the surrounding is relatively long even for a thin panel.

The concentrated nature of the light sources is therefore modulated by a plurality of optical mechanisms, such as: (1) The light rays or quanta can collide with a Titanium Oxide particle, surface imperfections or other microstructure part of a diffuser, upon which the light scatters in an appreciably random manner within the material. (2) The light rays or quanta can reach the interface between the panel material and the surrounding space at an angle less than a critical angle, and then exit the panel into the surrounding. (3) The light rays or quanta can reach an interface between the panel material and an interior component of the luminaire at an angle less than a critical angle, and then exit the panel and either be absorbed or reflected by the interior luminaire component. (4) The light rays or quanta can reach an interface between the optical material of the luminaire and the surrounding space or an interior interface between the optical material of the luminaire and some interior component at an angle greater than a critical angle, and then be reflected back into the panel. The critical angle is a function of the relative indices of refraction of the two materials that comprises the given interface.

In some alternate back-lit designs of the panel luminaire that place the LEDs behind the panel but oriented to emit light rays or quanta mostly orthogonally to the exterior surface, a thick diffusive layer must be used in order to sufficiently modulate and spread out the light from the concentrated source. In some alternate back-lit designs of the panel luminaire that place the LEDs behind the panel but oriented to emit light rays or quanta mostly orthogonally to exterior surface, a very high density of microstructures must be used in order to sufficiently modulate and spread out the light from the concentrated source.

The former alternate back-lit design requires more material in the panel and increases its weight and how much space it takes up. The latter alternate back-lit design increases the optical losses and worsen the operational economy of the luminaire as more electrical energy must be expended for a given unit of illumination of the room. The present innovation, described with reference to the above illustrative embodiments, accomplishes the optical modulation by extending the distance of propagation parallel with the plane of the luminaire and can thus keep the luminaire thin and with a comparatively small amount of microstructures.

Typical LEDs emit light rays or quanta at a wide angle: beam angles from 100 to 140 degrees are common. Therefore, without the opaque cover surface 1402, the luminaire as otherwise described can exhibit a hotspot of light above the center where the cluster of light sources is located. The opaque cover surface can however create the opposite problem and a dark spot becomes visible to the human observer in the middle of the luminaire exterior surface. This can be an undesired variation in the relative luminous emittance of the luminaire exterior surface.

That undesired quality can be removed by the optimization of the placement of microstructures. The amount of emitted light rays or quanta from a given surface element of the luminaire depends on the amount of light rays or quanta that at said surface element reaches the interface between the core of the light-transmitting body and the surrounding at an angle less than the critical angle for internal reflection.

At every surface element some number of light rays or quanta can propagate from within the core, but at incidence angles that do not imply they will exit the luminaire at said surface element. Therefore, for every surface element there can be a pool of light rays or quanta that can be redirected through scattering or reflection events to rather exit at said surface element than be internally reflected. In these terms, the opaque cover means that there can be fewer light rays or quanta in the segment of the core beneath the surface element or elements of the exterior luminaire surface which are above the opaque surface than elsewhere in the core of the light-transmitting body.

Due to reflection and scattering events elsewhere, there can however be a nonzero number of light rays or quanta that propagate beneath said surface elements. An appropriate increase of the relative probability of light scattering in this segment of the core can therefore make the given surface element or elements appear appreciably identical to any other surface element of the panel when viewed by the human observer. Consequently, the dark spot is removed and the LED cluster is cloaked in light. Through optical simulations, mathematical optimization, or iterated laboratory studies, the appropriate distribution of scattering particles or microscopic structural imperfections can be attained, given the various dimensions of the light-transmitting body and properties of the LEDs.

The above embodiments have been described in terms of one larger square. Other embodiments can be contemplated, which employs identical mechanisms of covered and cloaked LED clusters within a panel, where the panel is of a shape other than a square. Possible shapes include hexagon, circle, rectangle, triangle or any other polygon.

For these other shapes, the reflection surface and the distribution of microstructures have to be re-optimized for the new geometries. However the key aspects of the innovation remain the same: concentrated light rays or quanta are emitted from one or a plurality of LEDs, located in a cavity beneath the light-transmitting body from the perspective of the human observer, where the LED or LEDs are covered by an opaque surface, and the opaque surface is cloaked in light that can have propagated to the surface element above the opaque surface through a plurality of reflections, scattering and other optical events within the light-transmitting body, in particular redirection into the segment of the core above the opaque surface. Because the LEDs emit light predominately along the most extended dimension of the luminaire, the concentrated distribution of the light rays or quanta from the LED sources can be spread out prior to exiting in to the room, office or space in general, such that lighting design specifications are met, without increasing the thickness of the luminaire beyond a threshold.

In some embodiments, the LEDs and the cavity in which they are housed are not glued or otherwise irreversibly attached to the panel material. In these embodiments a user of the product can replace the panel, while leaving the electrical parts, including the LEDs, as is. A user can therefore adjust the visible shape of the luminaire depending on varying preferences or needs.

In some embodiments the replacement of the panel is done by unscrewing it from the electrical structure by applying torque to the panel. In other embodiments a latch mechanism is used to lock or unlock the two structures by pressing on a button or similar device to modify the shape of the luminaire. Other means to detach and reattach the optical and electrical structures can be contemplated.

In some embodiments the opaque cover surface can be of a different shape, such as but not limited to a cone, parabola or hemisphere.

In some embodiments, there are multiple pluralities of LEDs configured as described above. Each plurality of LEDs injects light into a light-transmitting body through a surface of said body, and once the light rays or quanta propagate through the light-transmitting body, modulations to their paths through reflections and scattering takes place, that is similar to the embodiments described above. Each plurality of LEDs is covered by an opaque material, which itself is cloaked in light that has arrived to the segment of the core of the light-transmitting body that is above the opaque material either, by transformations of the light rays or quanta emitted from the LEDs beneath said opaque material, or by a direct path from another plurality of LEDs, or by transformations of the light rays or quanta from another plurality of LEDs. In other words, multiple light sources increases the number of ways in which light rays or quanta can propagate through the core of the light-transmitting body into the segment of the core above each cavity in which the light sources are contained.

Figure 9:
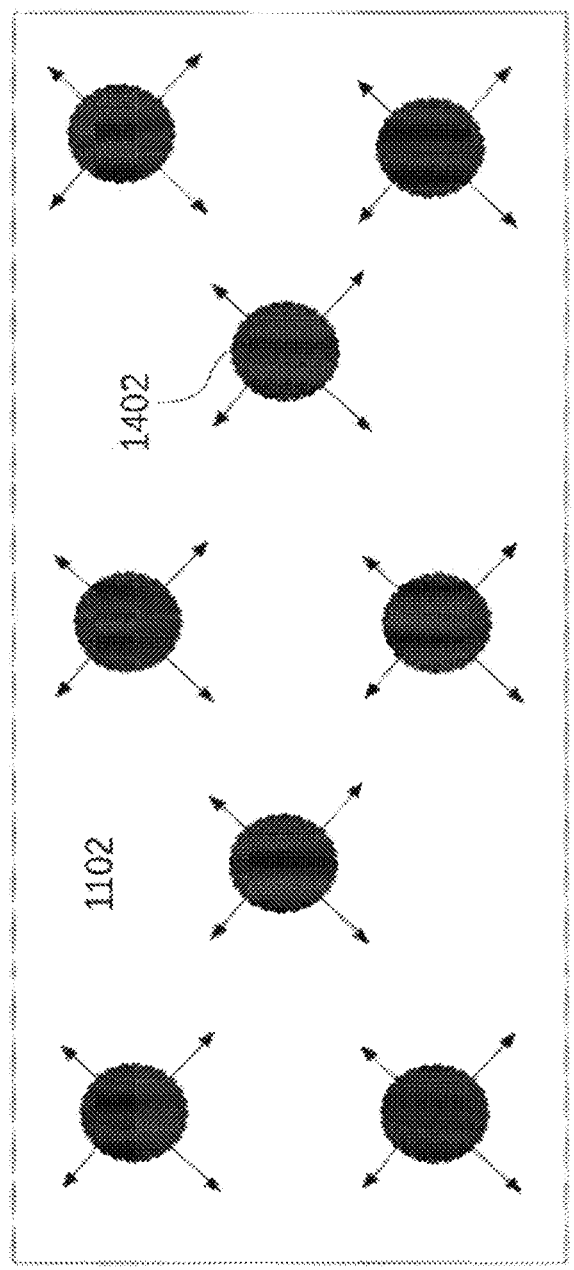
FIG. 9 illustrates eight LED clusters (darker circles) that each emit light radially into a rectangular panel, according to some embodiments. Each cluster is covered by an opaque structure and cloaked by light rays or quanta that propagate above the cover surfaces. The cloaking is not illustrated since otherwise the surface elements above the LED clusters would not be possible to distinguish from all other surface elements.

In one illustrative embodiment, shown in FIG. 9, there are eight clusters of LEDs, each with an opaque cover surface 1402, which are distributed beneath a wide, but thin, sheet of transparent or semi-transparent material. FIG. 9 shows the luminaire from the exterior point-of-view, such that it is the exterior surface 1102 of the luminaire that is shown, with the location of the covered and cloaked LEDs shown as disks with dashed line circumferences. As the LEDs are electrically powered, they inject light into the light-transmitting body through a surface, in FIG. 9 in a mostly circular fashion outwards from each cluster of LEDs, which through processes as described above, can cloak in an even light the cavities and LEDs from the human observer. The disks in FIG. 9 are therefore invisible under normal operations of the luminaire.

Because the light cloaking of the first opaque cover can arrive by a direct path from a second plurality of LEDs, which is not underneath the first opaque cover, this embodiment of the invention can involve fewer reflection or scattering events, than the embodiments in FIG. 7 and FIG. 8, in order to obtain an adequate number of light rays or quanta exiting the exterior surface through surface elements above the opaque surface materials.

Figure 10A:
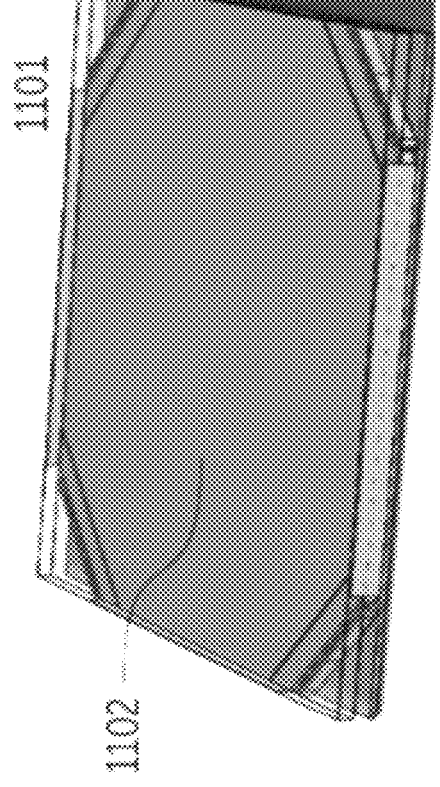
FIGS. 10A, 10B show a perspective illustration and a side view, respectively, of a luminaire embodiment that uses four covered and cloaked LED clusters, where each cluster is shaped such as to emit light within predominantly a 90-degree interval, according to some embodiments.
Figure 10B:
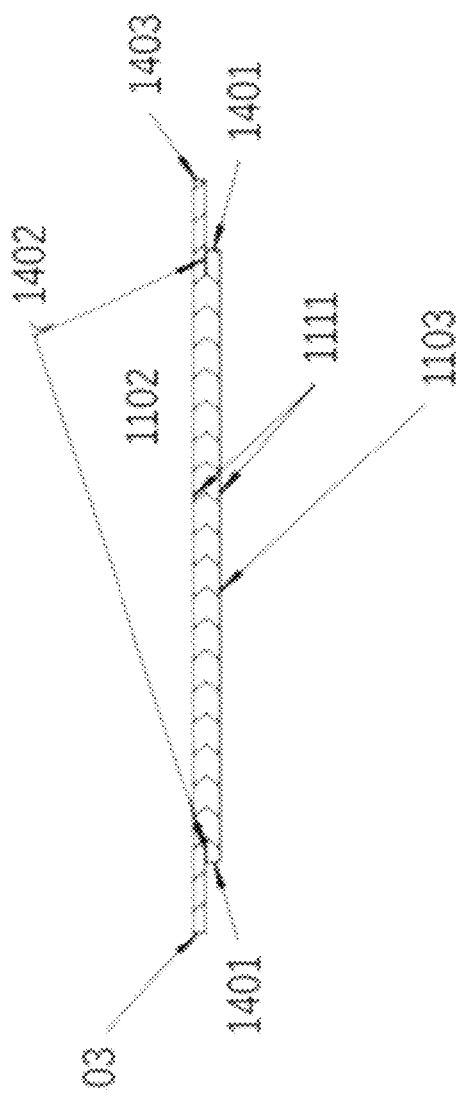

The clusters of LEDs have so far been described as emitting light in all directions parallel with the larger exterior surface of the thin panel of the luminaire. In some embodiments the clusters of LEDs can be structured such that they emit light in a bounded range of directions. In FIGS. 10A and 10B, an illustrative embodiment of a thin frameless luminaire 1101 is shown, which is comprised of four LEDs or four pluralities of LEDs 1401 that are structured to emit light predominantly within a 90-degree interval, where each LED or LED plurality 1401 is placed at each of the four corners of a square, where the LEDs are covered by an opaque cover surface 1402. The cover surface is itself covered by a part of the panel. Therefore, the cavities in which the clusters of LEDs are contained, and the corresponding opaque cover surfaces, can be cloaked in the light that is emitted from the exterior surface of the luminaire panel.

The light rays or quanta that cloak the opaque cover surface can arrive to the relevant surface elements from an LED source other than the one underneath the given opaque cover surface. Otherwise the manner in which the concentrated nature of the light rays or quanta from the LEDs are modulated by the optical design is similar to other embodiments. That is: (1) The light rays or quanta can collide with a Titanium Oxide particle, surface imperfections or other microstructure part of a diffuser, upon which the light scatters in an appreciably random manner within the material. (2) The light rays or quanta can reach the interface between the panel material and the surrounding space at an angle less than a critical angle, and then exit the panel into the surrounding. (3) The light rays or quanta can reach an interface between the panel material and an interior component of the luminaire at an angle less than a critical angle, and then exit the panel and either be absorbed or reflected by the interior luminaire component. (4) The light rays or quanta can reach an interface between the optical material of the luminaire and the surrounding space or an interior interface between the optical material of the luminaire and some interior component at an angle greater than a critical angle, and then be reflected back into the panel. The critical angle is a function of the relative indices of refraction of the two materials that comprises the given interface.

Other geometrical shapes of the LED pluralities and their location within a luminaire of some shape can be contemplated. That includes a luminaire shaped as an equilateral triangle where the LED clusters emit light mostly within a 60 degree interval and are situated at the three apexes of the triangle. That includes a luminaire shaped as a pentagon where the LED clusters emit light mostly within a 108 degree interval and are situated at the five corners of the pentagon.

In other embodiments the LED light sources can emit different colored light, rather than white light of identical optical spectra. By varying the relative current magnitudes for the plurality of LEDs, the light that is emitted from the luminaire can vary in hue and saturation, as instructed by color theory, including but not limited to the color models of RGB, CMYK, HSV, HSL, and CIE XYZ.

The colored light sources can further exacerbate the problem of obtaining a uniform appearance of the light from the luminaire since the light rays or quanta can be more heterogeneous with respect to what a human observer can resolve as visually distinct, than what is the case for LED sources that emit an identical, or nearly identical white light. The invention can still be used for colored LED sources. Through a sufficient number of scattering events attained by possibly a greater travel distance in a larger concealed section between the LED sources and the part with an exterior surface, or by a possibly general increase of the density distribution of microstructures or structural imperfections in the whole or parts of the optical material, adequate mixing can be obtained by the same optical mechanisms (1)-(4) as described above, for color LEDs as well as white LEDs, or a combination thereof.

Mechanical and Electrical Joining of a Plurality of Panels.

The total amount of light a thin frameless luminaire can emit, that is its luminous flux, is a function of the type and number of LEDs of the luminaire multiplied by a factor less than or equal to one, which quantifies losses, such as optical losses by absorption events. The luminous flux is spread out over the finite area of the panel or light-transmitting body in general. For reasons described in the section on lighting design above, the concentration of emitted light from the panel, that is the luminous emittance, can in architectural and interior design applications be required to be below a threshold. Different use-case of the room, the needs of its occupants and the size of the room can be contemplated, which can imply an optimal range of the total luminous flux that can exceed the maximum that one thin frameless luminaire in either of the above embodiments can emit within the lighting design constraints with respect to the luminance emittance.

Therefore, a plurality of thin frameless luminaires for a given space can be desired. They can be separately installed throughout the ceiling, walls, floors or other surfaces of the room, such that their aggregate luminous flux meets the requirements. This is conceptually like an installation of individually controllable light bulbs, fluorescent tubes, or luminaires in a room or office. There can be a benefit, however, to enable a user to join several individual thin frameless panels into one larger luminaire. The user can in some manner join the individual panels into what can be perceived as one luminaire unit, and can control them all as one larger unit, and can connect one or a small number of panels to electrical power in order to power the plurality of joined panels. In combination with logical instructions executed on one or a plurality of microprocessors or other computing devices, the plurality of assembled luminaire units can be spatially aware in the sense that the spatial proximity between a first luminaire unit and a second luminaire unit is known, or that a neighborhood query can be evaluated to return a Boolean variable that instructs if a first and a second luminaire unit are in direct connection, or that a connection graph for all luminaire units in the larger assembly is encoded as a data array and stored in a computer memory.

An assembly of smaller units of thin and frameless luminaires can have additional benefits for architectural or interior design applications than to provide a sufficient luminous flux. Examples include a fully vertical structure of a plurality of interconnected panels that range from the floor to the ceiling, which can change in both optical spectrum and intensity relative eye-level of the occupants of the room akin to a rising or setting sun. This can be used to emulate the changing sun during the course of a day and enhance the well-being of the occupants of the mostly artificially illuminated room. Another example is a mostly horizontal structure mounted on either a wall, in the ceiling, in the floor, or a combination of all, that dynamically alters the lighting output such that an apparent colored object is moving from one end of the assembly to the other. This can be used for wayfinding between locations in an otherwise confusing space.

Another example is a geometric structure of the assembled luminaire that varies its light output in accordance with sound or music that is received and converted into a digital signal. This can be used to enhance the ambiance of a room or space as both music and light are part in creating an exciting, calming, contemplative or inviting feeling among the occupants of the room or space.

An advantage of joining specifically frameless luminaire panels is that very large uniformly illuminated luminaires of highly customizable shapes can be obtained. Some use-cases in architecture and interior design can require very large luminaires, and some use-cases can require the luminaire to be shaped in ways that are not ordinarily available on the market as ready-made products. In these cases custom manufacturing is an available option. However, it can be both expensive and slow. The joining of frameless luminaire panels in regular or irregular configurations enables a user to meet the geometric specifications without custom manufacturing.

These are examples that illustrate that the joining of a plurality of thin frameless luminaire panels into a larger structure can be more than the sum of its parts, instead the system of joined luminaire panels can perform additional function that a set of disjointed luminaires cannot. In this section devices and methods that enable such joining are described.

Illustrative embodiments are described using the thin frameless luminaire panels disclosed in a section above, but it should be understood the devices and methods are not limited to only this type of luminaire panel or structure. Illustrative embodiments are described for panels of a square or rectangular shape, but it should be understood the devices and methods are not limited to only square and rectangular shapes.

The devices to join a plurality of panels can provide mechanical support, such that the assembled structure can be stable under separating, shear or bending forces below a threshold that otherwise would bring the panels apart. The devices to join a plurality of panels can provide electrical connections between panels, such that if one panel is electrically powered, the joined panels are electrically powered as well.

The devices to join a plurality of panels can provide data connections between panels, such that if a digital signal encoded through some modulation, such as frequency or amplitude modulation, is received or created by one panel, the signal can be transmitted to the other panels or other devices connected to the assembled luminaire. The devices to join a plurality of panels can provide one or a combination of two or more of the properties described above.

Figure 11:
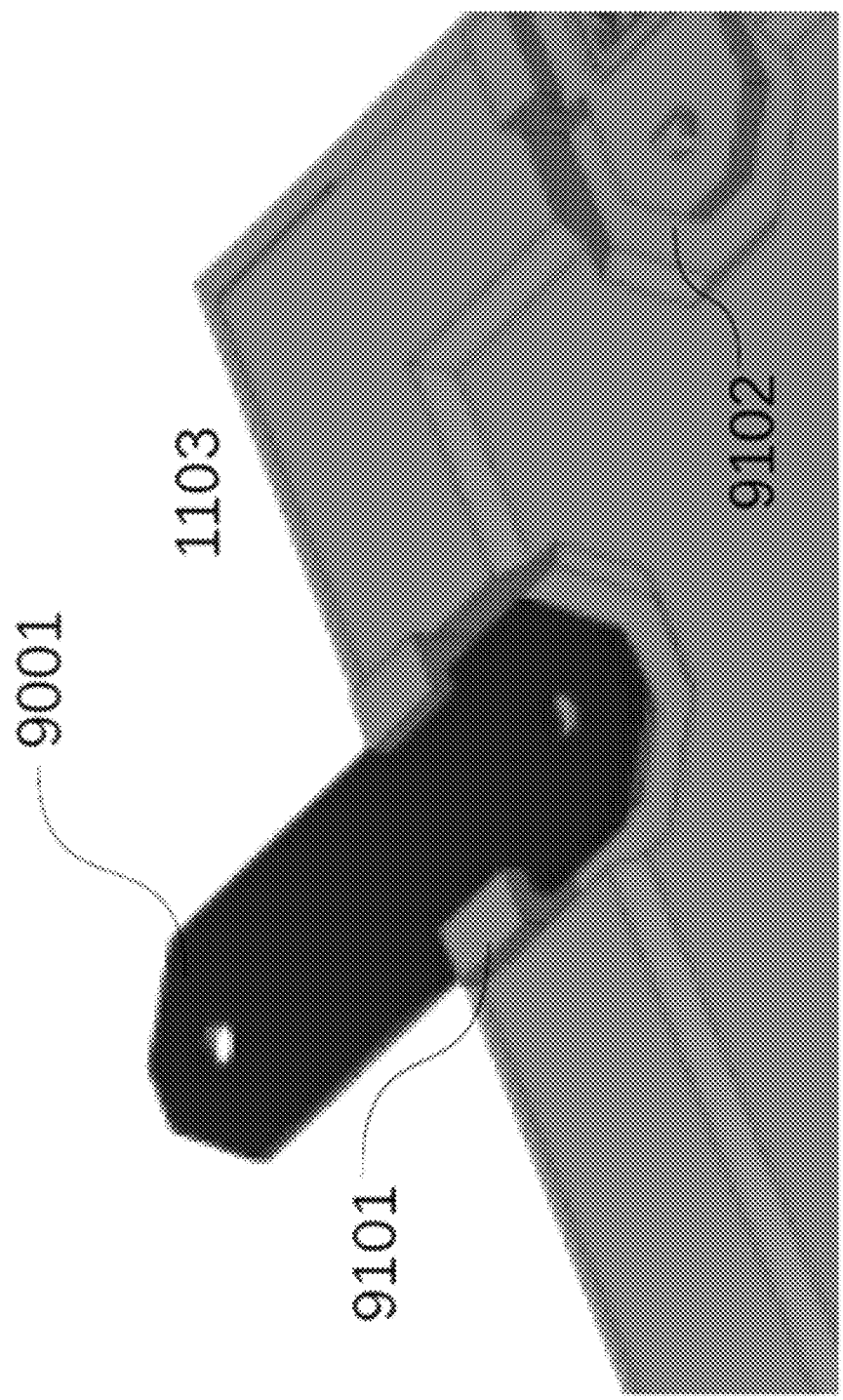
FIG. 11 illustrates a type of linker that is inserted into a slot part of the luminaire panel, which can bridge two adjacent panels and provide mechanical connection along with in some embodiments electrical and data connections, according to some embodiments.
Figure 12:
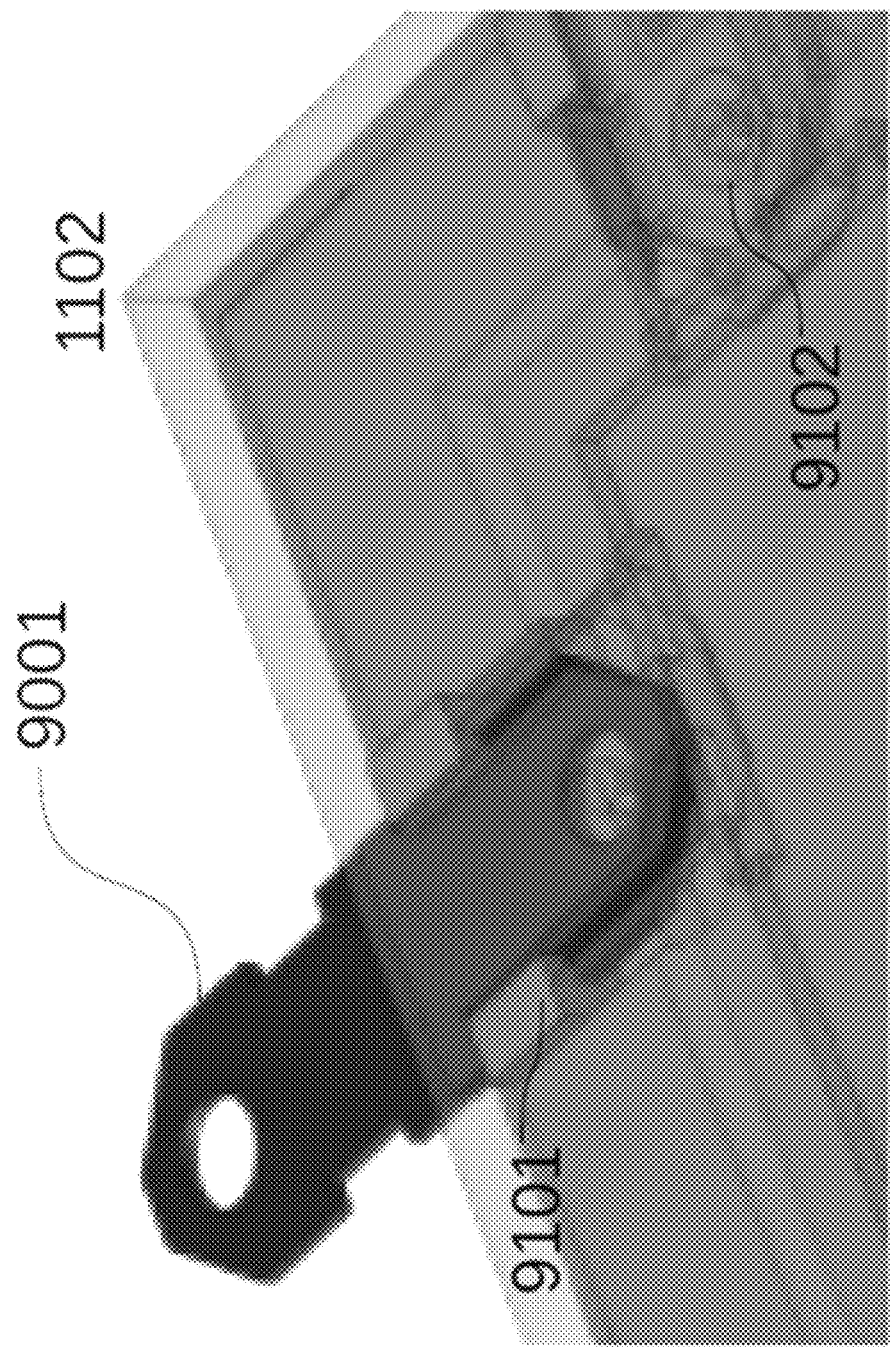
FIG. 12 illustrates a type of linker that is inserted into a slot part of the luminaire panel, which can bridge two adjacent panels and provide mechanical connection along with in some embodiments electrical and data connections, according to some embodiments.
Figure 13:
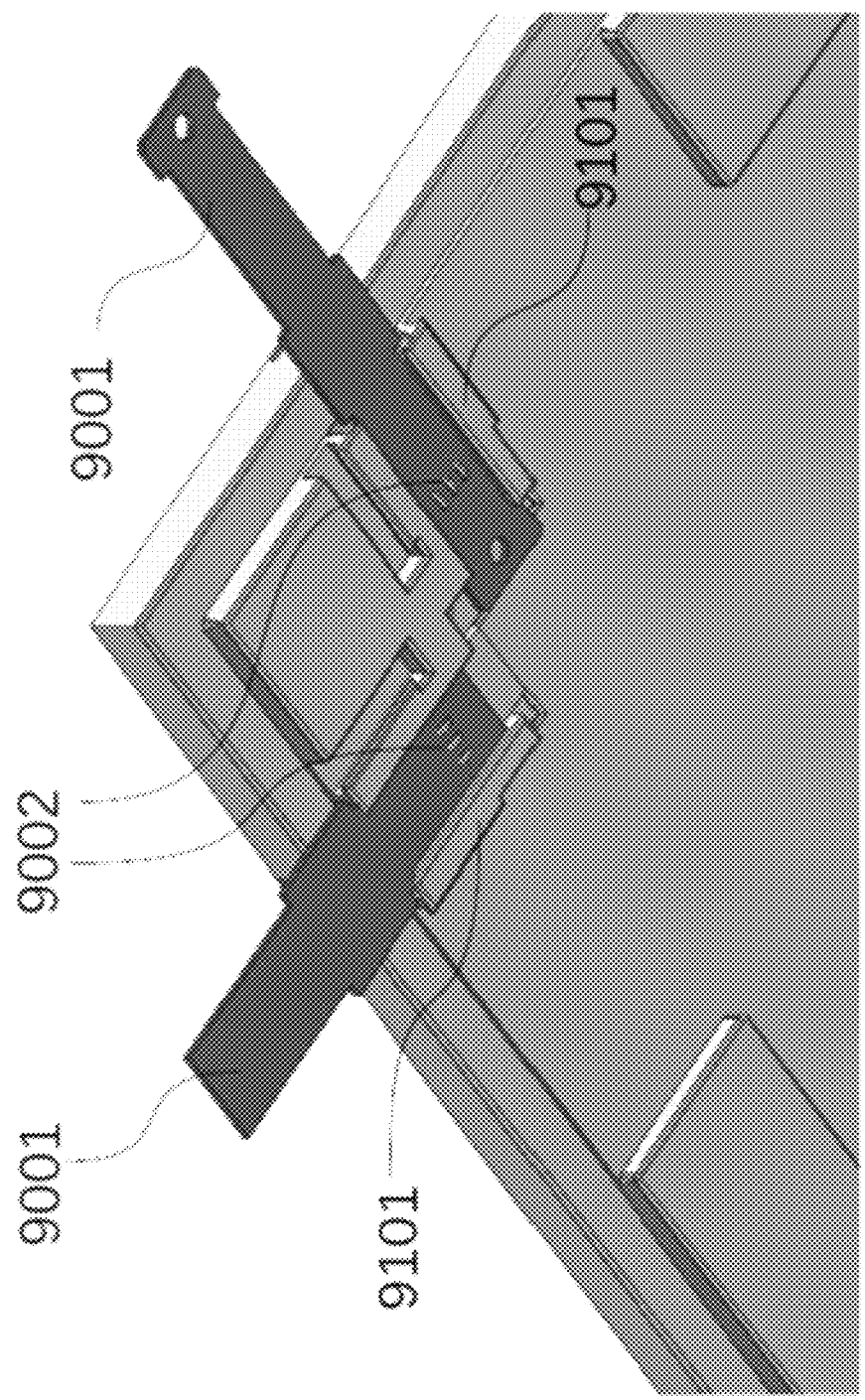
FIG. 13 illustrates two types of linker that are inserted into a slot part of the luminaire panel, which can bridge two adjacent panels and provide mechanical connection along with in some embodiments electrical and data connections, according to some embodiments.

In FIG. 11 and FIG. 12 and FIG. 13 illustrative embodiments of a linker are shown, which can function as a device to join a plurality of panels into a larger assembled unit with properties as listed above. The linker 9001 in FIG. 11 is a thin piece with one side longer than the other, like a rectangle, however with slightly rounded corners. The linker can be made of a material that is relatively durable and of a high stiffness, such as a plastic polymer or a metal, or a combination thereof. The linker can be made of a glassreinforced epoxy laminated material with an integrated copper foil, such as a printed circuit board with an FR-4 flame-retardant grade designation.

The linker slides into a slot 9102 that is built into the luminaire panel. The linker can therefore couple to electronic parts in the interior of the luminaire. In addition to an opening into which the linker fits, there can be a protruding piece of rigid material 9101, which further constrains the mobility of the linker once inserted into the slot. The slot can be located somewhere along the side of the panel, but situated somewhere at the interior surface 1103 of the panel, such that the appearance of the luminaire panel from the exterior view by the human observer can be unaltered in the presence of a linker.

The linker can bridge two adjacent panels by being inserted into a first slot of the first panel, and a second slot of the second panel. Through frictional forces between the linker and the slot in the panel, the required mechanical support is attained, such that the two panels are kept together when subjected to forces below a threshold. The linker can furthermore contain holes, indentations, ledges, protrusions, or moving parts that complementary fit with protrusions, ledges, indentations, holes, or moving parts of the panel slot, such that additional mechanical support is obtained. One illustrative embodiment of a linker and slot design that uses these methods to arrive at a specified mechanical support is depicted in FIG. 12.

Two additional illustrative embodiments of linkers are shown in FIG. 13. A combination of attachment mechanisms are employed in these embodiments of the linker 9001, as well as designs on the panel, like 9101, to keep the linker in a position wherein it affords specified mechanical support to two or more conjoined panels. Other combinations of linker shapes and parts, as well as slots shapes and parts, can be contemplated.

In some embodiments the linkers shaped as in FIG. 11 and FIG. 12 and FIG. 13 contain a conductive layer external, internal or both to the linker. The conductive layer can be made of copper, gold or other conductive material. In some embodiments the linker is a printed circuit board (PCB), which is comprised of a conductive layer within a flame-resistant fiberglass. PCBs are common in electronics and are readily customized and manufactured for a variety of use-cases. In some embodiments a thin wire of copper or other electrically conductive material, connects two or more conductive surfaces that are part of the linker structure and situated on opposite sides of the linker. Other methods to add conductive abilities to the linker can be contemplated.

The linker with conductive ability can provide electrical connections between the panels as long as one or more conductive components of a first panel are coupled to the conductive layer of the linker and one or more conductive components of a second panel are coupled to the conductive layer of the same linker. In FIG. 13 a section of the conductive parts of the linker is visible 9002.

Alternate current (AC) or direct current (DC) can be transmitted between the two panels joined by a linker. The linker with conductive ability can provide digital data connections between the panels as long as one or more conductive components of a first panel are coupled to the conductive layer of the linker and one or more conductive components of a second panel are coupled to the conductive layer of the same linker. In FIG. 13 a section of the conductive parts of the linker is visible 9002.

The digital data can be transmitted by a medium other than an electrically conductive one. The data can be transmitted by electromagnetic radiation. In some embodiments by electromagnetic waves of a frequency in the range 100 kHz to 10 GHz, as commonly used in device-to-device communication in a room or home. In some embodiments by electromagnetic waves of a frequency in the range 100 GHz to 10 THz for short-range communication. In some embodiments by electromagnetic waves are manifested as visible light. These illustrative media can move through air with antennas as the transmitting and receiving devices at each panel. These illustrative media can move through a wire that is mostly transparent to the particular type of wave, such as fiberglass for visible light. Other media can be contemplated for data transfer between panels.

The digital data can be encoded through some modulation, either by logic executed on a processor integrated in the interior parts of the particular panel, or at a secondary device connected to the plurality of panels, and can be decoded either by logic executed at another panel or at a secondary device connected to the plurality of panels. The modulation can be, but is not limited to, frequency modulation and amplitude modulation.

The digital data can be sent via separate conductive parts than the ones used for the transmission of electrical power between panels. The digital data can be sent via the same conductive parts that are used for the transmission of electrical power between panels. The digital data can be sent via conductive or non-conductive parts in the absence of any parts involving the linker and slot to transmit electrical power between panels.

The linkers can be comprised of multiple parts. In some embodiments the linkers are the only means to support two or more luminaire panels that have been joined. In some embodiments the linkers are only one part of the mechanical framework that keeps a plurality of panels together. A user can switch between these applications and the linkers can be structurally adjusted to accommodate these different needs.

The linkers can in some embodiments be inserted by pressing them into the slot along a vector parallel with the larger exterior surface of the luminaire. The linker can in some embodiments be inserted by pressing them into the slot along a vector orthogonal or in part orthogonal to the larger exterior surface of the luminaire. The latter embodiments have the advantage that one panel joined on two or more of its sides to other panels can be removed while leaving the remaining panels intact. A linker that is removed parallel with the larger exterior surface of the luminaire requires that no panel to be directly adjacent to the side from which the linker is removed. For very large assembled luminaires that are joined by parallel linkers can therefore require a greater effort in order to remove a panel near the center of an assembly.

The linker can be an integrated component to the panels. The linkers in these embodiments can be actuated as two panels are brought into each proximity, which can include magnetic attraction between two or more integrated linkers.

The digital signal that is sent between panels and any adjacent secondary device can be any control signal, such as instructions that a particular panel within the assembly should switch off or on or change its luminous flux or color. The digital signal can in some embodiments encode the state of or a change of state of the panel to other panels or a secondary device.

Illustrative examples include panels that are equipped with sensors that can discover if the panel is pressed, rubbed or tapped in some pattern or for some duration. The sensor or the sensor together with additional electronic components, such as a microprocessor, can be programmed to generate a digital signal which is transmitted through the plurality of joined luminaire panels and to any secondary devices joined to the panels. This signal can in turn trigger a plurality of control signals to other panels throughout the joined luminaire. The signals can encode a command to switch off all light. The signals can encode a command to switch to another intensity or color of the light.

The signals can encode a command sent to another device, connected by wire or by wireless data transmission by an antenna, to initiate some routine, such as playing music on loudspeakers, update a status message on a public social network, or ordering a specified type of product from a website for online commerce. Other types of sensors and actuators can be contemplated.

The placement of the slots or attachment points for the linkers in the panels can be in the middle of each of the four edges of the square, or other shape, of the luminaire panel. The attachment points can be offset from the middle such as at one-third, one-fourth or three-fourth the distance of a given side. The placement of the slots on each side can be such that they are at an identical position on two opposing sides. The advantage of the latter is that a pair of adjacent panels can overlap in case the corners of the pair of panels are aligned. The overlapping of slots enables a linker to bridge the pair of panels.

Figure 14C:
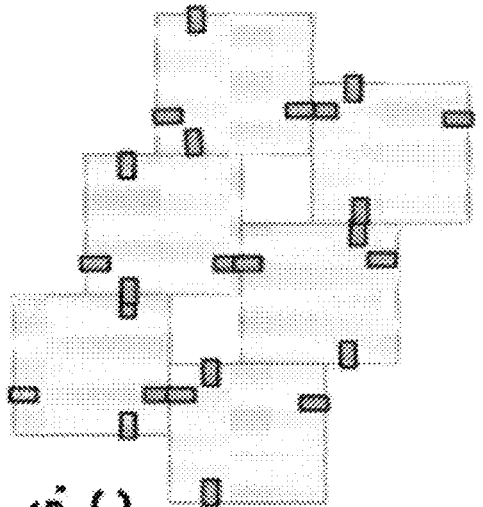
FIGS. 14A-14D illustrate four illustrative embodiments of six individual luminaire panels joined as one larger luminaire are given, according to some embodiments. Individual luminaire panels can be joined into a larger luminaire if the connection points are offset at one-fourth and three-fourth along the edges. The small and dark rectangles represents the location of the slots through which the linkers or other means of attachment are placed; size, shape and appearance of the slots are illustrative of relative position only and can in other embodiments be of different shape, size and appearance.
Figure 14D:
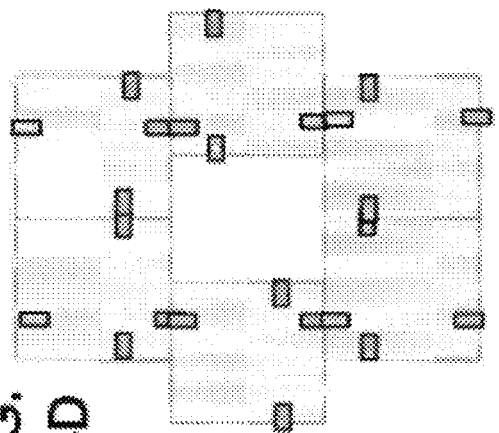
Figure 14A:
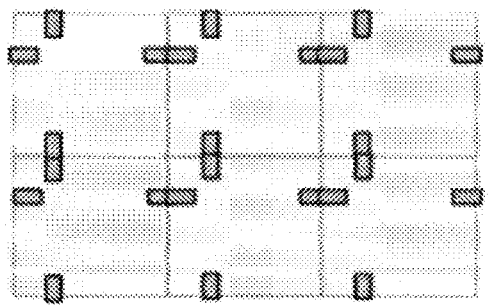
Figure 14B:
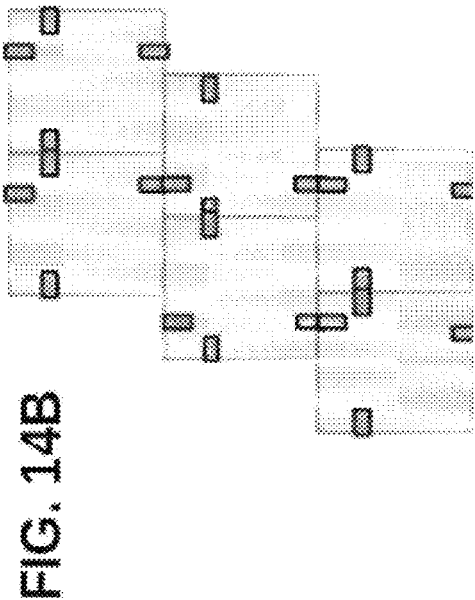

Slots that are offset from the middle can enable the creation of more varied assembled structures from a plurality of structurally identical panels. In FIGS. 14A-14D four illustrative embodiments of a system of six individual luminaire panels joined as one larger luminaire are given. The panels are joined together through offset connection points located at one-fourth or three-fourth of the distance of a given side. The connection points are illustrated in FIG. 14A-14D as smaller dark rectangles at the sides of the square panels, where the placement of connection points is identical within any given panel. In FIG. 14A the individual pieces are joined by fully overlapping the sides of adjacent squares. Larger squares or rectangles can thus be created from a plurality of individual luminaire panels. In FIG. 14B the individual pieces are joined by overlapping adjacent panels halfway. This is possible with connection points offset at one or three fourth of the side of the squares. Larger luminaire structures where light can travel in an apparent diagonal manner are therefore possible. In FIG. 14C a small gap is created within the assembled panels as they are joined in a different configuration enabled by the offset positions of the connection points. Geometric congruence can be used to prove that the gap in FIG. 14C is identical in shape as the individual panels in the luminaire, but with sides only half as long, hence only one fourth of the area as an individual luminaire panel. Luminaires assembled this way therefore include a mixture of dark and illuminated sections that can appear geometrically highly symmetric to the human observer. In FIG. 14D the assembly has been done such that a gap of the same size as an individual panel is created in the center of the larger assembly. This too is an example of a luminaire where dark and light intentionally are joined into a larger luminaire. The shapes in FIGS. 14A-14D are illustrative of how the panels can be joined through a plurality of slots on the sides of the panels, and how this construction enables a variety of larger assembled luminaires to be built by the reversible joining of a plurality of individual frames by the user. Additional designs can be contemplated.

The embodiments above are for panels shaped as squares. Other shapes are possible, such as rectangle, triangle, pentagon, hexagon or any other regular or irregular polygon. In order to join individual panels through a linker at least one side has to include a flat section, such that a linker can reach across without becoming visible to a user in the surrounding.

In FIGS. 15A-15D three individual luminaire panels 1101 of the particular embodiment described in relation to FIG. 5 are in the process of being joined.

The four photographs illustrate one possible series of steps performed by a user as follows: As in FIG. 15A, the three individual panels are put on a surface. At this stage no electrical power is coupled to the individual panels 1101 and no mechanical restraints have been introduced.

Figure 15D:
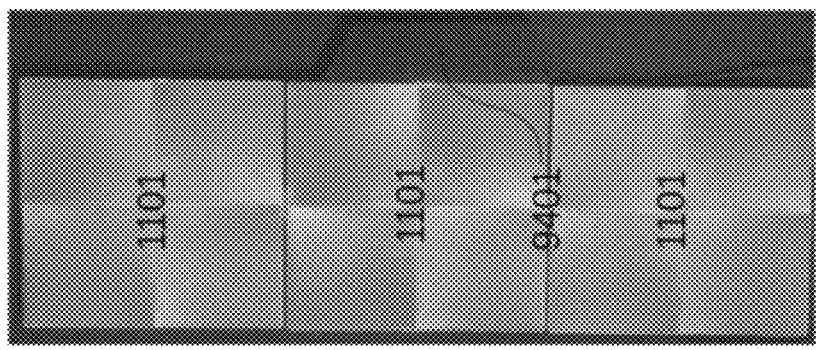
FIGS. 15A-15D show photographs of three luminaire panels in four stages of being joined as one larger luminaire wherein one panel is directly connected to an electrical power source, while the other two panels are powered through linkers that connect the panels.
Figure 15C:
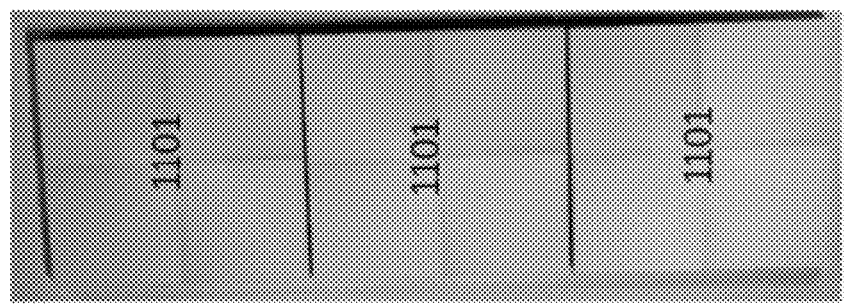
Figure 15B:
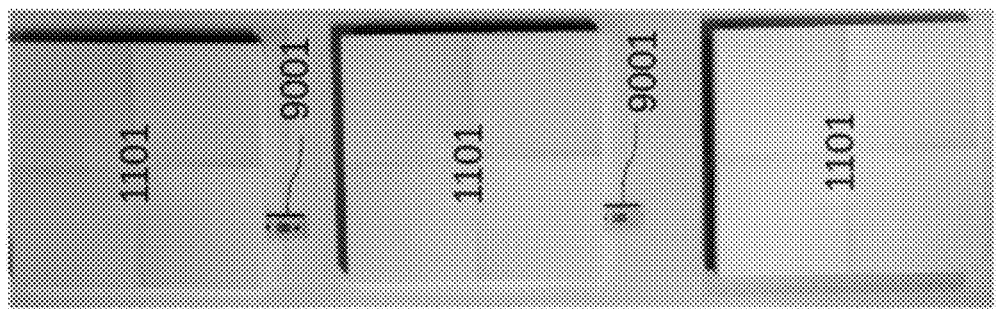
Figure 15A:
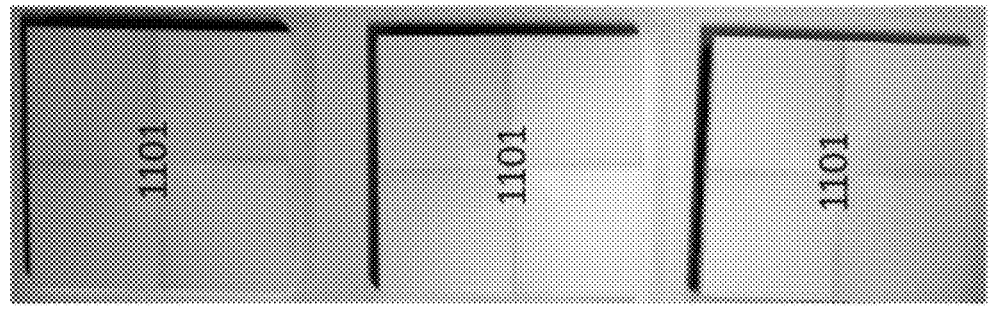

As in FIG. 15B, two linkers 9001 are inserted into slots in two separate panels. The insertion requires a modest force and once fully inserted there is a locking mechanism which keeps the linkers 9001 in a fixed position. As in FIG. 15C, the panels are pushed together, such that the linkers are inserted into a slot on the adjacent panel.

Hence, the two linkers bridge across a pair of panels, and in this case the panels form a rectangular luminaire of three times the surface area of the individual panels. As in FIG. 15D, one panel is connected to an electrical power source 9401, which is connected to the panel through the same type of slot as the linkers 9001 were inserted into.

The electrical power is transmitted via the linkers 9001 such that all individual panels are illuminated, not just the one in direct connection with the electrical power source. Additional panels can be added to the luminaire by adding linkers, and additional shapes and sizes can be attained. In this embodiment the linkers are reversibly inserted, therefore as lighting and design needs change, the panels can be manually separated and joined in a new configuration, such as but not limited to the ones shown in FIGS. 14A-14D.

Mechanical Frame for One or a Plurality of Luminaire Panels.

A luminaire attachment frame system for operation in combination with a plurality of appreciably flat luminaires, each luminaire having an interior surface and an exterior surface, is provided in some embodiments. The luminaire attachment frame system includes a plurality of frames, each frame with a front face, a back face and four edges, a plurality of slots in the edges of the frames, each slot connecting the exterior of the frame and the interior of a frame along an axis in the plane of the front and back of the frame; and at least one latch disposed in the frame detachably coupling the front face of the frame to the interior surface of the luminaire; a plurality of conductive bodies.

The pair of slots is provided in parallel alignment of a pair of adjacent frames accommodates one conductive body that bridges between the frames, and a conductive body couples electrically to a luminaire detachably coupled to the front face of the frame such that a luminaire coupled to a frame conceals the frame, the slots, the latches, the conductive bodies as the luminaire is electrically powered and is viewed from an acute angle relative the normal vector of the exterior surface, and the plurality of luminaires is electrically powered given one luminaire in the plurality of luminaires is electrically powered.

A thin frameless luminaire panel is of a relatively low weight since LEDs are small and a thin sheet of PMMA, PC, or similar material, is of relatively low weight as well. Panel luminaires that have a flat interior surface, that is opposite to the exterior surface from which light is emitted into the surrounding, can be mounted to an appreciably flat part of a wall, ceiling, floor or furniture with a double-sided adhesive pressed against the panel back and wall, ceiling, floor or furniture. The low weight and the relatively large surface against which the double-sided adhesive can be applied means that this method of installing the panel can be mechanically secure. For embodiments of the panel that includes slots for linkers, such as disclosed in the above section, a plurality of thin luminaire panels can be joined together and/or simultaneously be mounted to a wall, ceiling, floor of furniture through a more numerous use of the double-sided adhesive.

One advantage with this approach can be the ease by which a possibly large number of interconnected panels can be installed in a room or space. The nature of the double-sided adhesive also means that the panels can be taken down and rearranged into a new spatial configuration in case the illumination needs or interior design goals change. In embodiments of the luminaire where the linkers provide electrical connectivity between the panels, only one panel has to be connected to an electrical power source, such as the electrical grid or a battery, in order to power the larger assembled luminaire.

For some installations, the mechanical stability of the larger assembled luminaire can be of additional importance, such that the double-sided adhesive is considered insufficient. This can be relevant for installations that are intended to be installed once and remain in a permanent configuration with little or no maintenance over a longer duration, such as one year, five years, or twenty years (e.g., consider a nightclub, a stadium installation). For these installations a mechanical frame, or frame for short, can provide additional mechanical stability. The mechanical frame can be required to add little to no thickness or width to the light panel, such that the mechanical frame is not interfering with the desired appearance of the thin frameless luminaire. The mechanical frame can be required to be easy to install with the panel, such that the frame is not extending the duration of assembly and installation of a large assembled luminaire by more than a threshold of time per panel in the large assembled luminaire.

In embodiments where the individual luminaire panels can be joined by linkers for mechanical support, electrical connectivity and ability to transmit and receive digital data, the frame can be constructed to be compatible with said means of connections.

The mechanical frame can be made of a stiff material, such as aluminum, steel or plastic. The stiff material can afford sufficient structural stability against strain caused by bending, shear or other perturbing forces below a threshold that can be justified by the expected usage. The stiffness of the material can ensure that each side or component of the mechanical frame can be relatively thin and still afford sufficient stability. This can be important in cases where the frame should be thin in order to not disrupt the appearance of a thin and frameless luminaire when the exterior surface is viewed by the human observer.

The mechanical frame can contain one or a plurality of openings that are intended for screws, nails or other means to secure the frame to a wall, ceiling or other surface of the room. The frame can contain parts that are flat and polished, where double-sided adhesive tape can be firmly applied, or a drop of glue put, which once pressed against a wall, ceiling or other surface of the room can secure the mechanical frame in that position.

The mechanical frame can be of dimensions such that an individual panel of the luminaire fits snugly into the frame and therefore adds little to no additional volume per panel, or interferes with the frameless appearance, for a larger assembled luminaire.

The embodiments that are described below are for a square panel, but other shapes can be contemplated, such as but not limited to hexagon, triangle, rectangle, disk, oval or any regular or irregular polygon. The mechanical frame can contain additional openings and substructures that can be used to mechanically or electrically or otherwise join panels mounted in adjacent frames. This can for example be openings in which conducting linkers or other type of connectors can bridge adjacent individual luminaire panels. The linker can be any of the linker disclosed in a previous section, or the connection can be any other device able to create the mechanical or electrical or data connection between panels.

Figure 16:
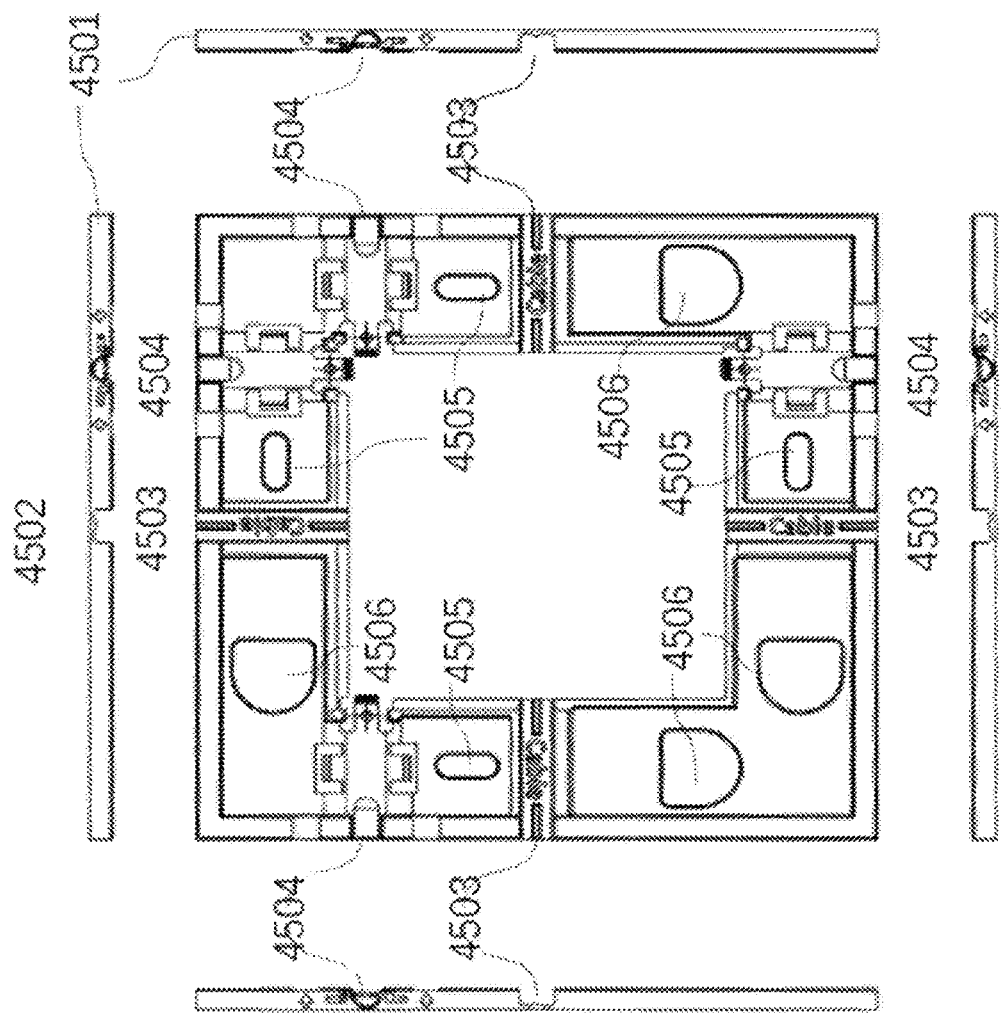
FIG. 16 illustrates an embodiment of a frame that can house a panel of a luminaire, according to some embodiments. The frame provides a rigid housing, which can be attached to a wall, ceiling or other surface by screws or adhesive tape. A frame also includes attachment points on each side such that adjacent frames, and consequently panels in the frames, become mechanically joined and electrically joined, according to some embodiments. The connection points can be offset from the middle of the edges.
Figure 17:
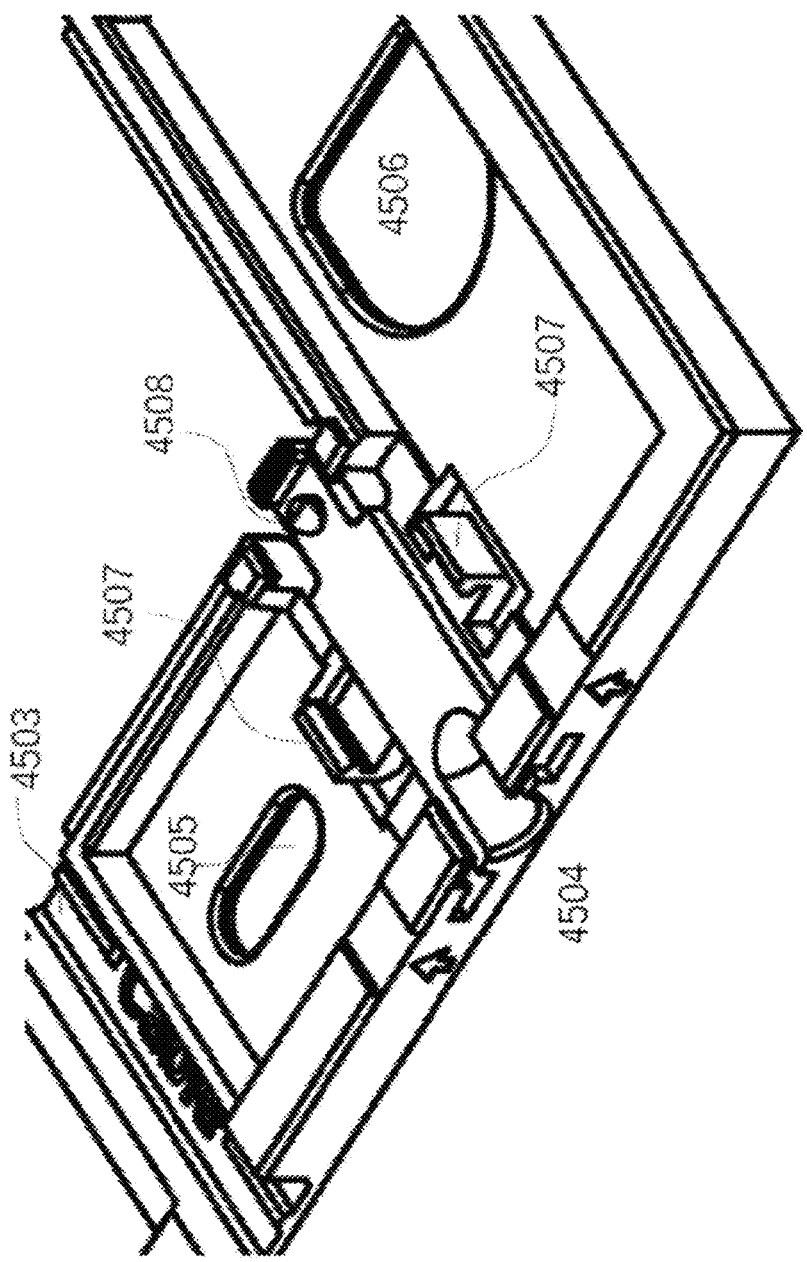
FIG. 17 illustrates a close-up of the linker slot and screw holes of the particular embodiment of a frame as shown in FIG. 16.

One embodiment of a mechanical frame is shown in FIG. 16 and a close-up of a section of the same embodiment is shown in FIG. 17. The frame is of a certain thickness 4501 that provides the specified the mechanical support. The thickness, however, can be relatively small, such as, but not limited to, 4 millimeters, 5 millimeters, 5.1 millimeters, 7 millimeters. The frame can be of a certain width 4502 that overlaps with the most extended dimension of the luminaire panel, wherein the two dimensions are perfectly aligned, such that no part of the mechanical frame is visible from the exterior view by the human observer. The width can be 150 millimeters in an example embodiment, or about 150 millimeters (e.g., +/−5 millimeters).

The mechanical frame can contain a number of openings and structural variations within the width and thickness of the frame. One such structural variation of the frame includes an elongated section of reduced thickness 4503 that connects the outer edge of the frame with an inner section of the frame, similar in shape to a trough, tray or channel. This section is used to guide cables between adjacent panels and frames, while keeping the cables on the interior side of the luminaire, such that they are hidden from the perspective of the human observer. The width of the elongated section 4503 can be 8 millimeters, which is sufficient for the standard wire gauges used in electrical lighting installations.

Another structural variation of the mechanical frame is opening 4504 of a shape that is complementary to a linker as described in a section above. The opening can be called a slot. In order to afford the assembled structure of frames the specified mechanical properties, such as stability under a separating, bending or shear force below a threshold, and an easy and intuitive assembly including linkers, the slot for the linker 4504 is equipped with additional designs. That can include reverse hooks 4507, which attach to a complementary section on the interior surface of the luminaire panel, as described above, such that when the luminaire panel is pressed against the frame, the reverse hooks 4507 lock the panel and frame together. That can include a bendable pin structure 4508, which is inserted into a complementary hole on a linker as the linker is inserted a sufficient distance into the opening 4504.

Both structures provide a mechanism by which distinct structural units of a larger assembly can be joined together by pressing the distinct structural units together in an intuitive effort of modest effort. Other latch mechanisms, which couple frame and luminaire panel together can be contemplated.

The frame can contain openings or holes that are directed orthogonally to the ones described above. That includes a hole 4505 through which a screw can be inserted and reach the backside of the panel. A screw with a head of a radius greater than the shortest dimension of the hole 4505 can therefore lock the frame to a wall, ceiling or other solid surface. In some installations a nail can be used instead.

The frame can contain a hole 4506 through which a section of double-sided adhesive can be put. Most of the double-sided adhesive can be on the side of the frame facing the wall, ceiling or other solid surface against which the frame is installed. However, a double-sided adhesive can be complicated to install because of its abundant stickiness.

Therefore, it can be helpful to the installation effort to enable the user to remove the non-sticky cover from one of the two sticky sides at the last possible moment before the frame is pressed against the wall, ceiling or other solid surface. The hole 4506 can enable a user to remove, at the last possible moment, a non-sticky cover to at least one of the two sticky sides of the adhesive, by a pulling or ripping motion from the side the user would press the frame upon installation, that is the side shown in the middle of FIG. 16.

The particular frame in FIG. 16 and FIG. 17 is shown to have these slots, openings and holes in a four-fold multiplicity. This is advantageous in that any side of a first frame can be used to join it to any side of a second frame. This is advantageous in that it can give flexibility to a user as a plurality of frames are joined as a larger assembly and installed against a wall, ceiling or other solid surface. Furthermore, the openings 4504 for the linkers are shown to be position at varying fractional separations from the corners of the frame. As described in relation to FIGS. 14A-14D, this design can create additional variations in how a plurality of frames are conjoined as a larger assembly. Other embodiments of a frame that are of a different multiplicity of openings or holes can be contemplated. Other embodiments of a frame that contain other openings and holes in order to enable additional functionality to the installation can be contemplated. Other embodiments of a frame that has the openings 4504 for the linkers at different fractional separations from the corners of the frame can be contemplated.

The mechanical frame can be used as part of the installation effort as follows. First, a plurality of frames are joined together into an assembly of a shape. The joining is done by a mechanism that affords any pair of adjacent frames in the assembly mechanical stability against a force below a first threshold that otherwise would separate the pair of adjacent frames. Second, the assembly of frames are mounted by a mechanism to a surface in the room, office or space in general. The mounting mechanism affords the assembly as a whole mechanical stability against a force below a second threshold that otherwise would separate the assembly from the surface of the room, office or space in general.

Third, a first luminaire panel is lowered into one frame of the mounted assembly, the interior surface of the panel towards the frame. At a separation between panel and frame, an interlocking mechanism is actuated and the panel is latched into the frame. The interlocking mechanism affords the first panel and frame mechanical stability against a force below a third threshold that otherwise would separate the first panel and frame. Fourth, a second luminaire panel is lowered into another frame, not already occupied by a panel, of the mounted assembly, the interior surface of the panel towards the frame. As in previous step, an interlocking mechanism of the same qualities can be actuated. The fourth step can be repeated until all frames of the mounted assembly are occupied by luminaire frames.

Additional intermediate steps can be contemplated. An additional step can be the application of linkers between frames, between panels, or between frames and panels. The linkers can afford mechanical stability, electrical connectivity, data connectivity or a combination thereof between any pair of adjacent frames of luminaire panels. An additional step can be the placement of a cable between frames in the assembly, prior or after the mounting of the assembly, such that the cable is hidden from view after the luminaire panels are put into place.

Different sequences of steps can be contemplated. This includes, but is not limited to, the joining of frames to other frames, and the joining of luminaire panels to frames prior to the mounting of the assembled luminaire to a wall, ceiling or other surface of the room of space in general. Other sequences of installation can be contemplated.

Other interlocking mechanisms than the one described in relation to FIG. 16 and FIG. 17 can be contemplated. The mechanism can be a spring-loaded latch, which recedes laterally as it is pressed from above, but which snaps back to its original position once the luminaire panel has passed some threshold distance into the frame. The panel can be released from the frame by pressing a button or pulling on some protrusion, which makes the spring-loaded latch recede and thus making the panel free to be removed. For example, the interlocking mechanism can be a detent mechanism, wherein the individual luminaire panel can be attached to the frame and detached from the frame by applying sufficient pushing and pulling force, respectively. For luminaire panel embodiments wherein the optical and electrical parts can be separated, the frame can contain separate mechanisms to lock the electrical components and the optical components to the frame. The mechanism can be an attractive magnetic force, which involves bringing two oppositely polarized magnets close together, wherein the first magnet is part of the frame and the second magnet is part of the luminaire panel.

The mechanism to join frames to other frames can be embodied in a number of ways. In some embodiments this mechanism includes additional devices part of, or separate from, the frame to ensure such stability within reasonable boundaries of normal use, while also enabling a user to reversibly attach and detach the pair of frames using a reasonable amount of effort, such as less than five seconds, less than thirty seconds and less than one minute for each pair of frames that are joined.

The use of linkers, which through a combination of frictional force and an interlocking mechanism, affords the necessary stability to separating, shear or bending forces has been described above in relation to FIG. 17. The linkers in these embodiments can connect both panels and frames together, mechanically as well as electrically.

Figure 18:
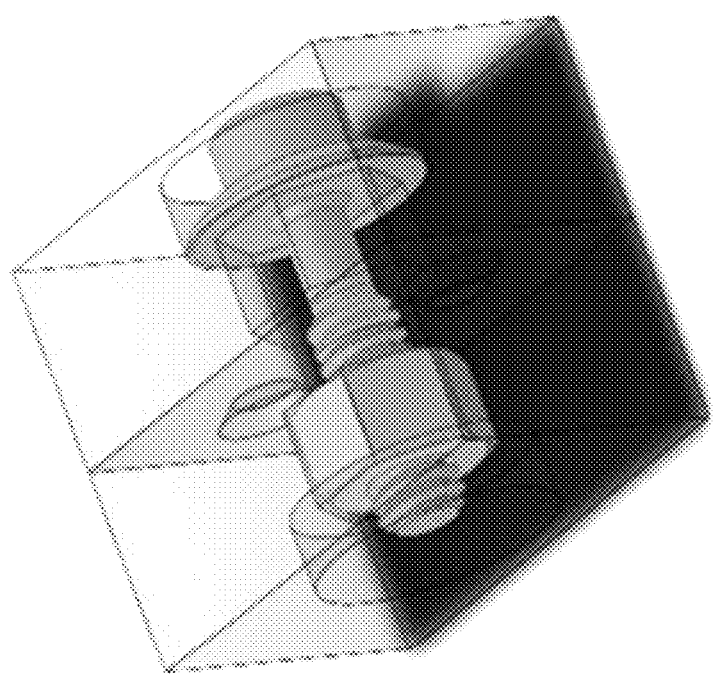
FIG. 18 illustrates a fastener and a nut that bridges two adjacent frames, according to some embodiments.

Another embodiment of a device that enables the mechanism to join frames to other frames is shown in FIG. 18. A fastener and a nut of appropriate dimensions and type, such as machine screws, hex bolts, hex nuts, wing nuts or any similar types, are used to reversibly attach two frames together. At least one of the two parts bridge the two frames through one or a plurality of aligned openings of the pair of frames. The two parts are joined and the nut is locked into position as it is screwed sufficiently far to squeeze against some part of the frame. The material of the fastener and nut can be plastic, Aluminum, Steel or other metal.

Figure 19:
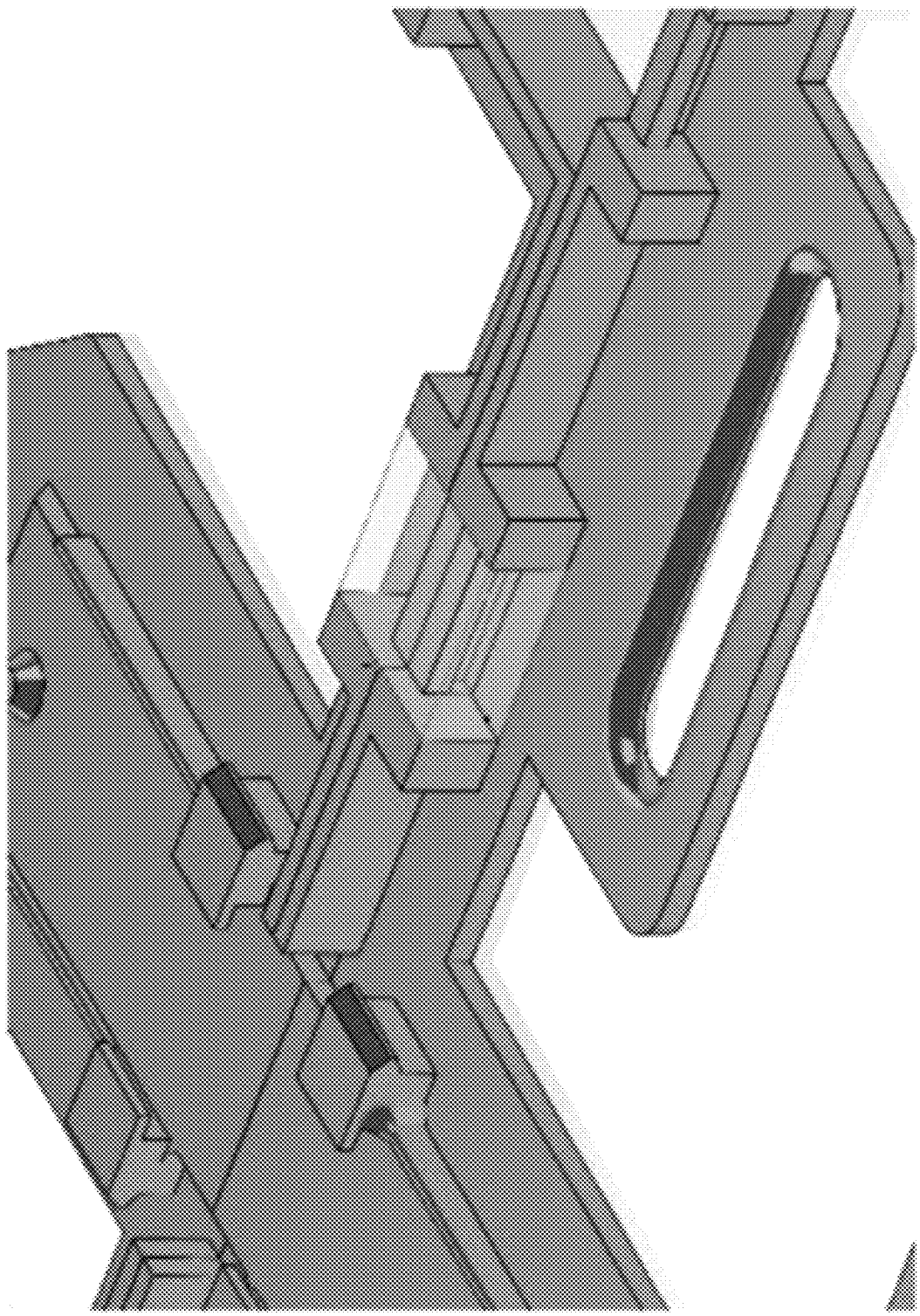
FIG. 19 illustrates a fastener (e.g., clip) that has been pushed in place over a protrusion between two adjacent frames and applies a force that joins the two edges, according to some embodiments. The clip can be removed by slightly bending it as the material is elastic within bounds meaningful for a single user to operate.

Another embodiment of a device that enables the mechanism to join frames to other frames is shown in FIG. 19. A clip partially opens as it is pressed against a ledge or other part of the pair of frames, then moves in place and closes forming an interlocking configuration that presses the two sides together of the pair of frames. The clip is made of a material and of a thickness such that the clip can slightly bend as force is applied to it, and where the clip also can revert back to an original configuration if force less than some threshold amount is applied to the clip. Examples of materials include plastic, Aluminum, Steel or other metal. Clips of similar requirements exist and can be made of bent thin material, less than one millimeter, one millimeter, two millimeters.

Figure 20:
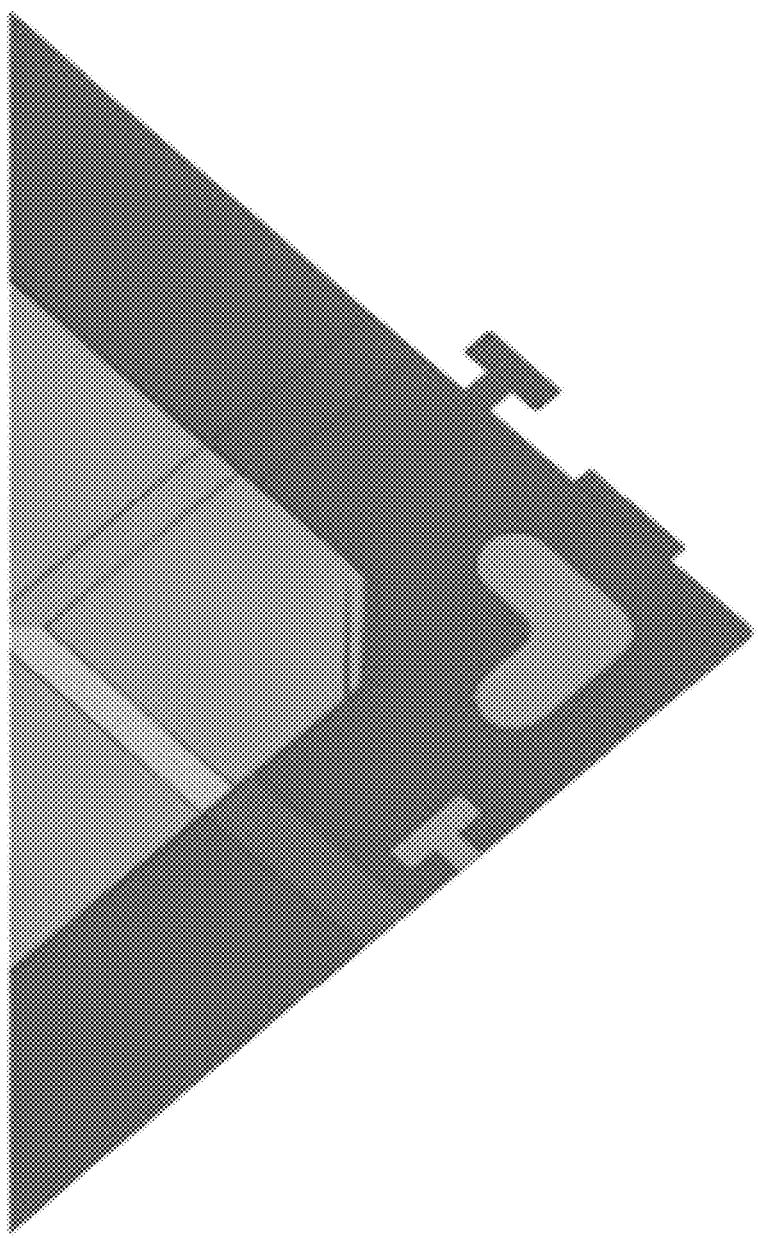
FIG. 20 illustrates an indentation and a protrusion that enables a jigsaw-like joining of two adjacent frames, according to some embodiments.

Another embodiment of a device that enables the mechanism to join frames to other frames is shown in FIG. 20. The frames include indentations and protrusions that can interlock similar to a jigsaw puzzle. This method is very fast to employ. This method can by itself offer limited resistance to shear force, however, and can benefit from being combined with other means to securing a pair of frames.

Figure 21:
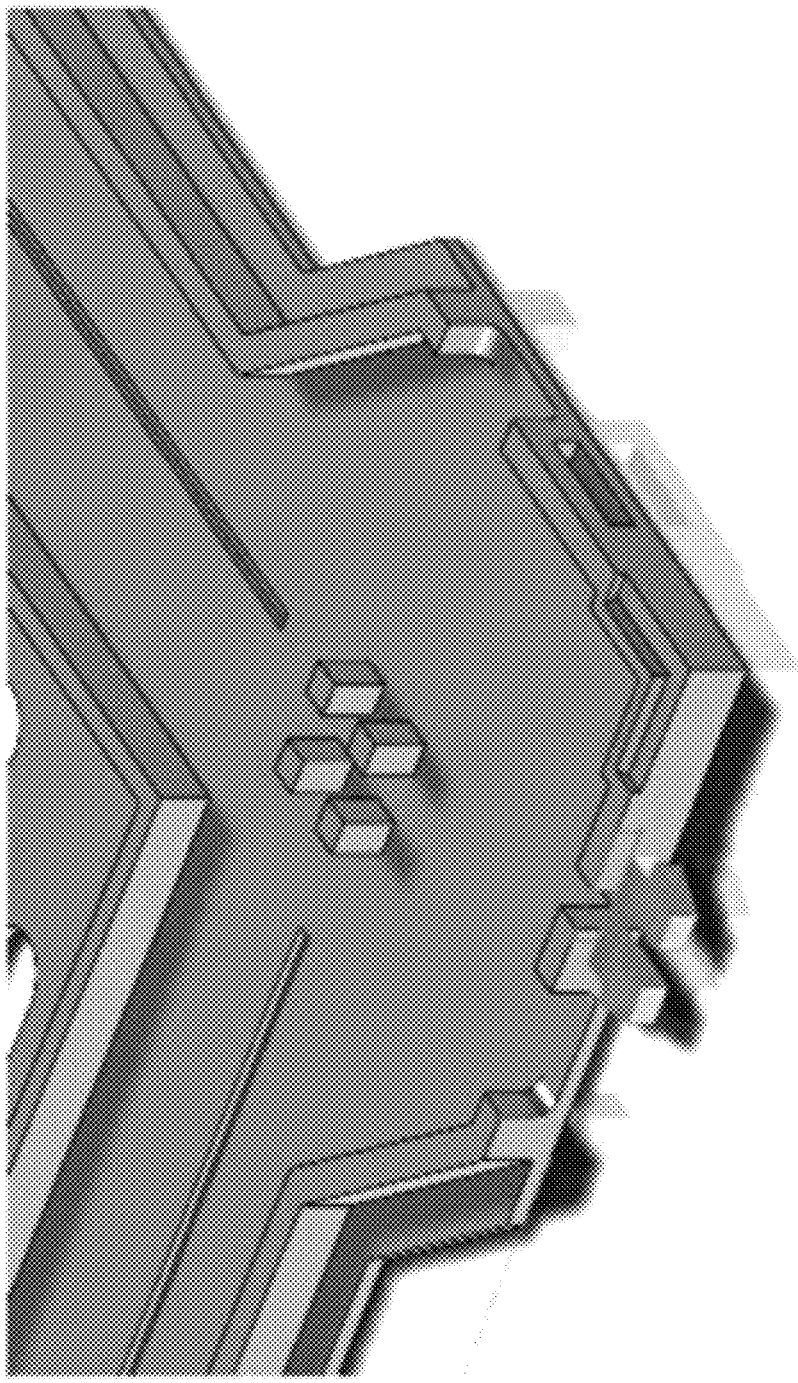
FIG. 21 illustrates a device similar to a belt-buckle which latches two frames together once brought into sufficiently close contact, according to some embodiments.

Another embodiment of a device that enables the mechanism to join frames to other frames is shown in FIG. 21. The frames include a latch mechanism similar to a belt buckle. In an example configuration, one or more protrusions are inserted into an indentation. As the insertion happens, one or more elastic and movable components of the protruding element or the indented element bend as it adapts to the force that is applied to it. Beyond a threshold insertion the movable component bend back and locks the two parts together until the movable parts are manually bent to release the lock.

System of Modular Connected Thin Frameless Luminaire

Some embodiments disclosed above include optics and structure to enable a frameless thin panel that can be illuminated with a uniform light. Embodiments can, for example, include a device that can join two or more such panels such that they are mechanically secured to each other, electrically connected and/or able to communicate a digital signal between each other. Systems can include a frame that can both secure a frameless thin panel within the frame, and that can be mechanically secured to another frame without obstructing the electrical or other joining of the panels within each frame. Each feature does not require the other and can be practiced separately. However, if embodiments are used in unison they comprise a larger system of a modular connected thin frameless luminaire. This section describes various embodiments thereof.

The panels are modular in the sense that they can be joined in a plurality of configurations that creates variation with respect to total size as well as relative location of adjacent panels. In other words the grid structure can be varied, and even with the embodiment of a single square structure with slots for connecting to neighboring panels at one-fourth and three-fourth the distance of the sides, the combinatorial possibilities are vast. During the installation, the user can choose any of these possibilities with a modest installation effort. Or in cases where the architecture is very restrictive, the panels can be combined into a larger luminaire without the need to manufacture an expensive custom-made product.

The frameless feature means that as panels are modularly joined, no or only extremely narrow boundaries are visible between the individual panels. The appearance of the larger luminaire can therefore be like a single illuminated surface rather than as a combination of individual pieces. The thin structure and the lack of a frame are obtained without the loss of light quality, since the light rays or quanta from the concentrated LED sources are mixed by a concealed part of the optics.

The embodiment that enables data transmission between panels further enables lighting use-cases where the larger luminaire acts as a single piece rather than as a plurality of individual units. Through the execution of logical instructions, panels and their software controller can ascertain how they are connected, including which panel is adjacent to the other, or at the opposite end of the other, or if there is a particularly long axis in the larger luminaire, like in an elongated ellipsoid. That further allows the panels or their software controller to execute logical instructions that shift the optical output in a coordinate fashion that creates, for example, an appearance of a moving object in the larger luminaire surface, or undulating light from one end to the other.

Embodiments of methods, systems, and apparatus are described through reference to the drawings.

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

The embodiments of the devices, systems and methods described herein may be implemented in a combination of both hardware and software. These embodiments may be implemented on programmable computers, each computer including at least one processor, a data storage system (including volatile memory or non-volatile memory or other data storage elements or a combination thereof), and at least one communication interface.

Program code is applied to input data to perform the functions described herein and to generate output information. The output information is applied to one or more output devices. In some embodiments, the communication interface may be a network communication interface. In embodiments in which elements may be combined, the communication interface may be a software communication interface, such as those for inter-process communication. In still other embodiments, there may be a combination of communication interfaces implemented as hardware, software, and combination thereof.

Throughout the foregoing discussion, numerous references will be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

The technical solution of some embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described herein are implemented by physical computer hardware, including computing devices, servers, receivers, transmitters, processors, memory, displays, and networks. The embodiments described herein provide useful physical machines and particularly configured computer hardware arrangements.

Although the embodiments have been described in detail, it should be understood that various changes, substitutions and alterations can be made herein.

Moreover, the scope of the present application is not intended to be limited to the particular embodiments of the process, machine, manufacture, composition of matter, means, methods and steps described in the specification.

As can be understood, the examples described above and illustrated are intended to be exemplary only.

The invention claimed is:

1. A luminaire comprising:
at least one light-emitting diode (LED);
a plurality of light-transmitting bodies; wherein each light-transmitting body of the plurality of light-transmitting bodies comprises:
a first surface through which light from the at least one LED enters the light-transmitting body;
a second surface through which the light exits the light-transmitting body;
a core coupled to both the first surface and the second surface, such that light propagates through the core between the first surface and the second surface; and
wherein, the first surface is situated on a first plane, the first plane having a lower elevation level relative to a plane of the second surface with respect of a direction through which the light exits the light-transmitting body;
wherein, a first light-transmitting body in the plurality of light-transmitting bodies is positioned in relation to at least one second light-transmitting body in the plurality of light-transmitting bodies to tile, to conceal, or to cover overlapping portions or interconnected portions of the first light-transmitting body and the at least one second light-transmitting body.

2. The luminaire of claim 1, wherein each light-transmitting body further comprises microstructures configured to redirect light incident thereto, a spatial arrangement of the microstructures inside the light-transmitting bodies, and the shape of the core of the light-transmitting bodies is adapted such that the surface element of the second surfaces of the plurality of light-emitting bodies emits a proportion of the light that entered the light-transmitting body through at least one of its first surfaces.

3. The luminaire of claim 2, wherein the spatial arrangement of the microstructures inside the light-transmitting bodies, and the shape of the core of the light-transmitting bodies is adapted to maintain a deviation of amount of emitted light from any surface element of the plurality of second surfaces from an average amount of emitted light from all surface elements of the plurality of second surfaces less than 20%.

4. The luminaire of claim 1, further comprising a third light-transmitting body in the plurality of light-transmitting bodies, wherein the second light-transmitting is tessellated in relation to the third light-transmitting body and a concealing portion of the second light-transmitting body conceals a concealed portion of the first surface of the third light-transmitting body from view at the acute angle relative a normal vector of any of the second surfaces of the light-transmitting bodies of the plurality of light-transmitting bodies;
wherein the third light-transmitting is tessellated in relation to the first light-transmitting body and a portion of the third light-transmitting body conceals a concealed portion of the first surface of the third first-transmitting body from view at the acute angle relative the normal vector of any of the second surfaces of the light-transmitting bodies of the plurality of light-transmitting bodies.

5. The luminaire of claim 1, wherein any first light-transmitting body in the plurality of light-transmitting bodies is arranged relative to the second light-transmitting body and a third light-transmitting body in the plurality of light-transmitting bodies, such that the first surface and the segment of the core of the first light-transmitting body are contained in the concealed portion of the first-light-transmitting body which is a cavity underneath the second surface of the second light-transmitting body in the plurality of light-transmitting bodies;
and the second surface of the first light-transmitting body covers from above a cavity in which the first surface and the segment of the core of the third light-transmitting body in the plurality of light-transmitting bodies is contained.

6. The luminaire of claim 5, wherein a recursive relation on indices of the plurality of light-transmitting bodies is applied, such that any second surface of a light-transmitting body covers from above one and only one first surface and a segment of the core of another light-transmitting body, and that any first surface and the segment of the core of a light-transmitting body is disposed in a cavity within the concealed portion underneath one and only one second surface of another light-transmitting body.

7. The luminaire of claim 1, wherein the light-transmitting body is thinner at a greater separation from the first surface than at a shorter separation from the first surface, given that both the shorter and greater separations are above a threshold, such that the relative amount of the light that propagates through the light-transmitting body that is redirected by reflection to exit the second surface increases as the distance from the shorter to the greater separation increases.

8. The luminaire of claim 1, wherein the surface elements of the second surface closest to the first surface of the light-transmitting body are positioned in relation to the core and the first surface, such that surface elements of the second surface closest to the first surface of the light-transmitting body are reachable by light that enters through the first surface and that propagates through the light-transmitting body in a path without scattering of a scattering angle greater than about 45 degrees.

9. The luminaire of claim 1, further comprising an internal electrical driver that is concealed as the luminaire is electrically powered and is viewed from an acute angle relative the normal vector of any of the second surfaces.

10. A luminaire comprising:
at least one light-emitting diode (LED);
a light-transmitting body; the light-transmitting body including:
a first surface through which light from the at least one LED enters the light-transmitting body and is dispersed through reflection or re-direction to generate at least first and second light rays;
a second surface through which light exits the light-transmitting body, the first surface situated on a first plane, the first plane having a lower elevation level relative to a plane of the second surface with respect of a direction through which the light exits the light-transmitting body;
a core coupled to both a first surface and a second surface, such that the light can propagate between the first surface and the second surface;
microstructures configured to redirect light incident in relation to at least one of the at least one first surface, the second surface, and the core;
at least one opaque layer which blocks light incident thereto; wherein the first surface and the second surface include structural features that cause internal reflection whereby the first light rays propagate through the light-transmitting body, reflect off the first surface and exit the second surface directly, and the second light rays propagate through the light-transmitting body, reflect internally within the core and exit the second surface at a position proximate to the opaque surface.

11. The luminaire of claim 10, wherein the spatial arrangement of the microstructures inside the light-transmitting bodies, and the shape of the core of the light-transmitting bodies are configured such that any surface element of the second surfaces emits a proportion of the light that entered the light-transmitting body through at least one of its first surfaces.

12. The luminaire of claim 11, wherein the spatial arrangement of the microstructures inside the light-transmitting bodies, and the shape of the core of the light-transmitting bodies is adapted such that a deviation of amount of emitted light from any surface element of the plurality of second surfaces from an average amount of emitted light from all surface elements of the plurality of second surfaces is less than 20%.

13. The luminaire of claim 10, comprising a first cavity and a second cavity, each of which contains an LED, a first surface and an opaque layer, wherein the shape of the core of the light-transmitting body and the placement of microstructures and the relative placement of the cavities are configured, such that a portion of all light from the LED of the first cavity enters the light-transmitting body through the first of the first surfaces, propagates through the core of the light-transmitting body to at least one segment of the core of the light-transmitting body that covers the second cavity in which the second LED, the second of the first surfaces and the second of the opaque layers are contained, and by reflection and scattering exits the light-transmitting body through the segment of the second surface above said segment of the core of the light-transmitting body.

14. The luminaire of claim 10, wherein the second surface of the light-transmitting body has a surface area more than one-hundred times as large as the surface area of the first surfaces of the light-transmitting body.

15. A luminaire comprising:
at least one light-emitting diode (LED);
a light-transmitting body; the light-transmitting body including:
a first surface through which light from the at least one LED enters the light-transmitting body and is dispersed through reflection or re-direction to generate at least first and second light rays;
a second surface through which light exits the light-transmitting body, the first surface situated on a first plane, the first plane having a lower elevation level relative to a plane of the second surface with respect of a direction through which the light exits the light-transmitting body;
a core coupled to both a first surface and a second surface, such that the light can propagate between the first surface and the second surface;
microstructures configured to redirect light incident in relation to at least one of the at least one first surface, the second surface, and the core;
at least one opaque layer which blocks light incident thereto; wherein the first surface and the second surface include structural features that cause internal reflection whereby the first light rays propagate through the light-transmitting body, reflect off the first surface and exit the second surface directly, and the second light rays propagate through the light-transmitting body, reflect internally within the core and exit the second surface at a position proximate to the opaque surface, wherein a plurality of distinct cavities are situated at corners of the light-transmitting body with a second surface, wherein each cavity contains at least one LED, a first surface, and an opaque material surface, wherein the shape of the core of the light-transmitting body and the placement of microstructures are configured, such that a portion of the light that enters the light-transmitting body through the first of the first surfaces exits through the segments of the second surface above the other cavity of the plurality of cavities.

16. The luminaire of claim 10, wherein three distinct cavities are situated at the three apexes of the light-transmitting body with a second surface in the shape of an equilateral triangle, wherein each cavity contains at least one LED, a first surface, and an opaque material surface, wherein the shape of the core of the light-transmitting body and the placement of microstructures are configured, such that a portion of the light that enters the light-transmitting body through the first of the first surfaces exits through the segments of the second surface above the second and third cavity.

* * * * *